(12) United States Patent
Nakamitsu et al.

(10) Patent No.: US 6,975,968 B2
(45) Date of Patent: Dec. 13, 2005

(54) MEDICAL SYSTEM CONTROL APPARATUS, AND METHOD FOR DEALING WITH TROUBLE WITH THE MEDICAL SYSTEM CONTROL APPARATUS

(75) Inventors: Takechiyo Nakamitsu, Hachioji (JP); Akinobu Uchikubo, Iruma (JP); Kyo Imagawa, Oume (JP); Masaya Fujita, Sagamihara (JP); Nobuyuki Furukawa, Hachioji (JP); Takashi Ozaki, Hachioji (JP); Hiroyuki Mino, Hino (JP)

(73) Assignee: Olympus Corporation, Tokyo (JP)

( * ) Notice: Subject to any disclaimer, the term of this patent is extended or adjusted under 35 U.S.C. 154(b) by 541 days.

(21) Appl. No.: 10/071,578

(22) Filed: Feb. 8, 2002

(65) Prior Publication Data

US 2002/0105409 A1    Aug. 8, 2002

(30) Foreign Application Priority Data

| Feb. 8, 2001 | (JP) | 2001-032749 |
| Feb. 8, 2001 | (JP) | 2001-032750 |
| Aug. 1, 2001 | (JP) | 2001-233886 |
| Nov. 30, 2001 | (JP) | 2001-367813 |

(51) Int. Cl.[7] ............................................ G05B 23/02
(52) U.S. Cl. .................. 702/184; 600/300; 607/59; 607/60; 340/3.1
(58) Field of Search ............................ 702/182–185; 600/300, 301, 483; 607/59, 60; 340/3.1, 340/525; 700/17, 18, 21, 275

(56) References Cited

U.S. PATENT DOCUMENTS

| 5,678,568 A | 10/1997 | Uchikubo et al. |
| 6,430,451 B1 * | 8/2002 | Takahashi et al. ............. 700/3 |
| 6,480,762 B1 * | 11/2002 | Uchikubo et al. .......... 700/253 |
| 6,659,948 B2 * | 12/2003 | Lebel et al. ................ 600/300 |
| 6,675,801 B2 * | 1/2004 | Wallace et al. ........ 128/205.23 |
| 6,831,665 B2 * | 12/2004 | Tsuda et al. ................ 715/740 |
| 2002/0032470 A1 * | 3/2002 | Linberg ....................... 607/60 |

FOREIGN PATENT DOCUMENTS

JP          7-303654          11/1995

* cited by examiner

Primary Examiner—Carol S. W. Tsai
(74) Attorney, Agent, or Firm—Scully, Scott, Murphy & Presser

(57) ABSTRACT

A medical system wherein multiple medical devices are connected to a system controller which controls the medical devices via communication lines is arranged such that in the event that trouble occurs, a user operates a maintenance button, which causes the system controller to display multiple trouble items relating to the actions of the medical devices on a display panel, and the user specifies a trouble item matching the currently-occurring trouble from the displayed multiple trouble items, whereby the system controller performs estimation processing for recovering from the specified trouble item and displays countermeasures information for recovering from the trouble item based on the estimation processing, and the user performs processing following the displayed countermeasures information, thereby enabling trouble to be efficiently recovered from.

13 Claims, 35 Drawing Sheets

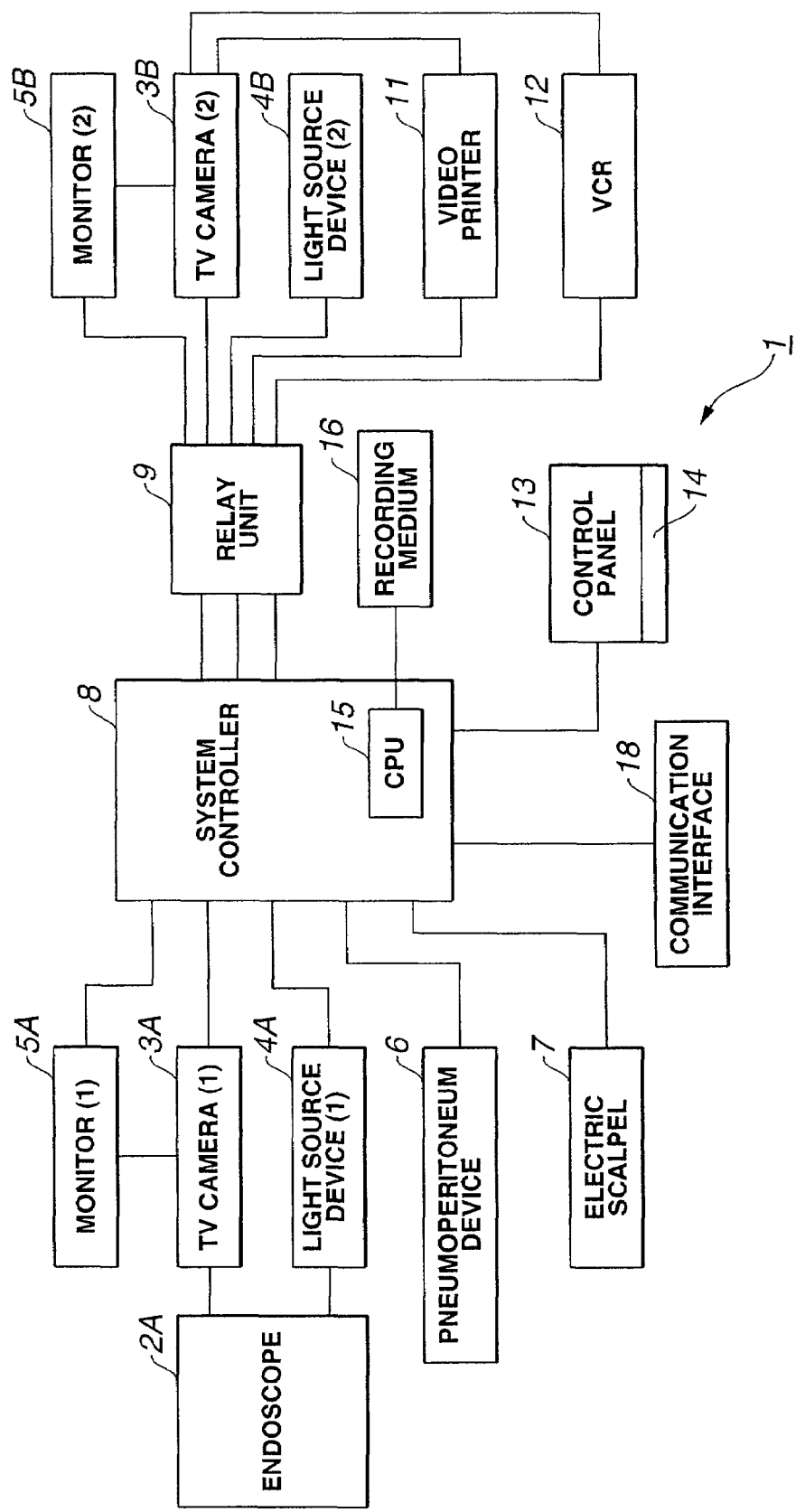

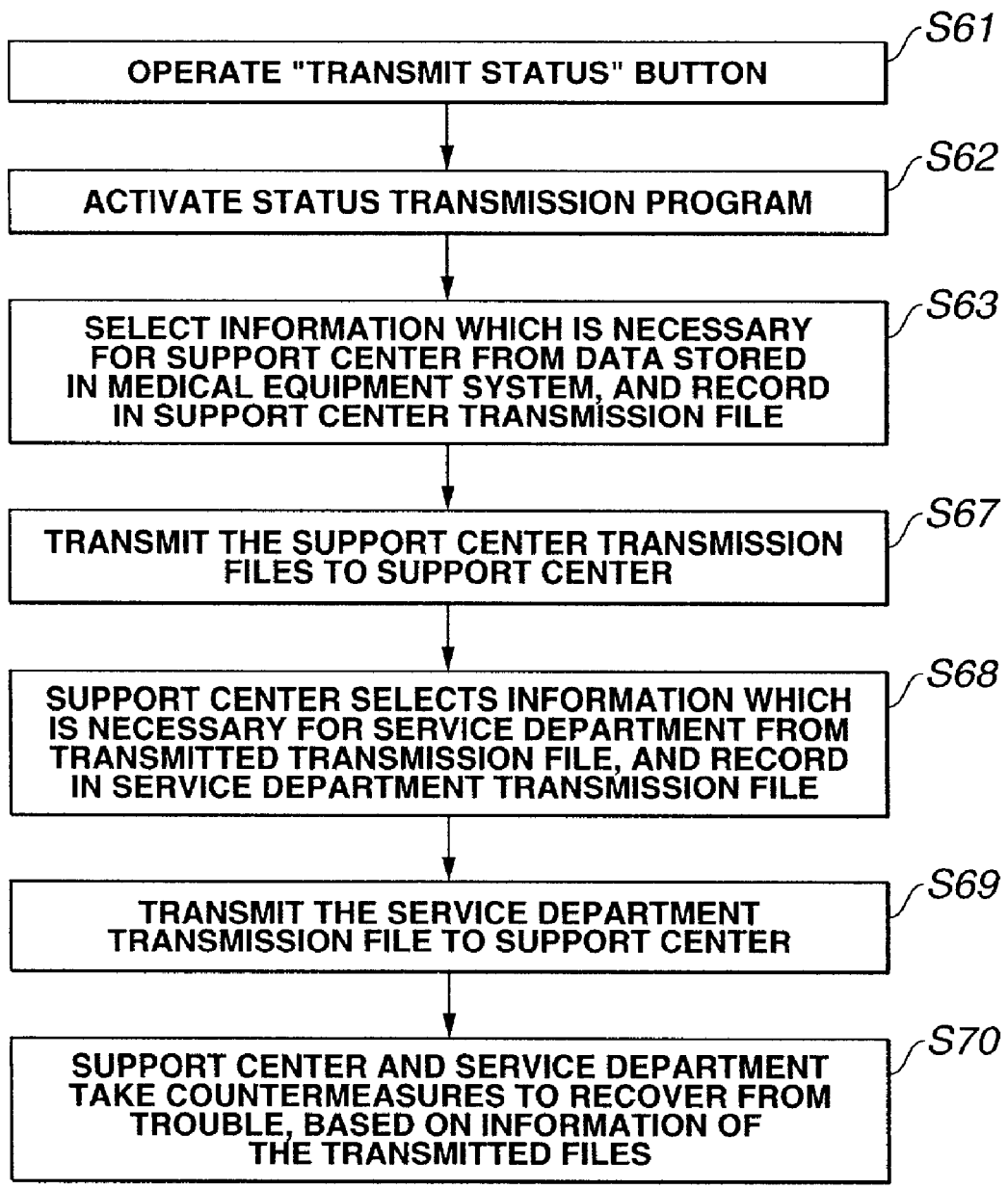

MEDICAL SYSTEM CONTROL APPARATUS, AND METHOD FOR DEALING WITH TROUBLE WITH THE MEDICAL SYSTEM CONTROL APPARATUS

This application claims benefit of Japanese Application Nos. 2001-032749 filed on Feb. 8, 2001, 2001-032750 filed on Feb. 8, 2001, 2001-233886 filed on Aug. 1, 2001, and 2001-367813 filed on Nov. 30, 2001, the contents of which are incorporated by this reference.

BACKGROUND OF THE INVENTION

1. Field of the Invention

The present invention relates to a medical system control apparatus for controlling multiple medical devices or the like, and a method for dealing with trouble with the medical system control apparatus.

2. Description of the Related Art

In recent years, endoscope devices for example have come to be widely used in the medical and industrial fields.

Particularly, in the medical field, it has become widespread practice for endoscope operations or endoscope examinations to be made with system configurations having connected thereto endoscope peripheral equipment (medical devices) other than the endoscope devices themselves, such as high-frequency cauterization devices (electrically-driven scalpels), and examples of prior art thereof include, for example, U.S. Pat. No. 5,678,568, and Japanese Unexamined Patent Application Publication No. 7-303654.

With the system control apparatus disclosed in Japanese Unexamined Patent Application Publication No. 7-303654, the multiple pieces of medical equipment connected to the system controller are controlled in a centralized manner, and in the event that an error (or trouble) occurs with medical equipment connected thereto, the system controller detects errors thereof via a communication line, and displays the contents of the error, thereby facilitating resolving of the error.

However, with the conventional art, in the event that there is trouble due to malfunctioning of the equipment or the like, this could be detected by monitoring the state of operation of the equipment, but in the event that there is trouble relating to set-up for using the equipment, due to erroneous settings made for the equipment, erroneous connection between devices, etc., stemming from insufficient knowledge of how to operate the equipment or the like, the equipment itself operates correctly, so monitoring the state of operation of the equipment can neither detect trouble nor indicate how to deal with the trouble.

Also, the conventional art has shortcomings, such as not being able to specifically indicate how to recover from errors or trouble.

SUMMARY OF THE INVENTION

Accordingly, it is an object of the present invention to provide an easy-to-use medical system control apparatus and a method for dealing with trouble with the medical system control apparatus, wherein, even in the event that an undetected error or trouble occurs, a method for recovering from the trouble is indicated, so that recovery to a trouble-free state is facilitated.

It is another object of the present invention to provide a medical system control apparatus and a method for dealing with trouble with the medical system control apparatus, suitable for solving trouble and the like is a speedy manner.

It is a further object of the present invention to provide a medical system control apparatus and a method for dealing with trouble with the medical system control apparatus, suitable for efficiently solving occurring troubles.

To this end, a medical control apparatus, connectable to medical equipment used for medical purposes, comprises: a processing unit for outputting control signals for controlling the medical equipment based on a control program stored in a predetermined recording medium; a communication interface for transmitting control signals output from the processing unit to the medical equipment, and for receiving states of operation from the medical equipment and outputting the states of operation to the processing unit; and a tutorial program recorded in the predetermined recording medium for executing, with the processing unit, processing for supporting the handling of trouble relating to operations of the medical equipment; so as to provide an operator with support in the event that trouble occurs, such that the trouble is solved and the equipment can be set to a trouble-free state.

BRIEF DESCRIPTION OF THE DRAWINGS

FIGS. 1A through 14 relate to a first embodiment of the present invention, wherein:

FIG. 1A is a block diagram illustrating the overall configuration of a medical device system comprising the first embodiment of the present invention;

FIG. 2 is a diagram illustrating a specific example of a normal operating screen;

FIG. 3 is a diagram illustrating a menu window screen and trouble recovery operation screen;

FIG. 4 is a diagram illustrating a display example of a recovery operation screen;

FIG. 5 is a diagram illustrating an advice screen;

FIG. 6 is a diagram illustrating a mixed screen;

FIG. 7 is a diagram illustrating an enlarged-display advice screen;

FIG. 8 is a diagram illustrating an icon;

FIG. 9 is a flowchart illustrating actions in the maintenance mode;

FIG. 10 is a flowchart illustrating actions of a first modification;

FIG. 11 is a diagram illustrating a selection screen for proceeding with the maintenance mode;

FIG. 12 is a diagram illustrating a menu window screen and trouble recovery operation screen, displayed in the event that the standard mode is selected;

FIG. 13 is a diagram illustrating a menu window screen and trouble recovery operation screen, displayed in the event that the expert mode is selected;

FIG. 14 is a flowchart illustrating actions of a modification;

FIGS. 15 through 19 relate to a second embodiment of the present invention, wherein:

FIG. 15 is a block diagram illustrating the overall configuration of a medical device system comprising the second embodiment of the present invention;

FIG. 16 is a flowchart illustrating actions in the maintenance mode;

FIG. 17 is a flowchart illustrating actions in the event that a status transmission button has been operated;

FIG. 18 is a block diagram illustrating the overall configuration of a medical equipment control system comprising a modification of the second embodiment;

FIG. 19 is a flowchart illustrating actions in the maintenance mode;

FIGS. 20A through 25 relate to a third embodiment of the present invention, wherein:

FIG. 20A is a diagram illustrating a recording unit for recording error information being provided to the recording medium according to the third embodiment;

FIG. 21 is a diagram illustrating an error information display window rendered from the menu window screen and trouble recovery operation screen shown in FIG. 20B;

FIG. 22 is a diagram illustrating a pneumoperitoneum device installation information input screen rendered by operating the maintenance button in the normal operating screen;

FIG. 23 is a diagram illustrating an installation information input screen rendered by the installation information input screen shown in FIG. 22;

FIG. 24 is a first diagram illustrating a modification of the menu window screen and trouble recovery operation screen shown in FIG. 20B;

FIG. 25 is a second diagram illustrating a modification of the menu window screen and trouble recovery operation screen shown in FIG. 20B;

FIGS. 26 and 27 relate to a fourth embodiment of the present invention, wherein:

FIG. 26 is a diagram illustrating the menu window screen and trouble recovery operation screen according to the fourth embodiment of the present invention;

FIG. 27 is a diagram illustrating an error information display window rendered by the menu window screen and trouble recovery operation screen shown in FIG. 26;

FIGS. 31 through 35 relate to a fifth embodiment of the present invention, wherein:

FIG. 31 is a block diagram illustrating the overall configuration of a medical equipment control system comprising the sixth embodiment of the present invention;

FIG. 32 is a block diagram illustrating the overall configuration of the medical device system;

FIG. 33 is a flowchart illustrating the controlling actions of the system controller in the event that the status transmission buttons is operated;

FIG. 34 is a block diagram illustrating the overall configuration of the medical equipment control system according to a modification; and FIG. 35 is a flowchart illustrating the controlling actions of the system controller in the event that the status transmission buttons is operated in a modification.

DESCRIPTION OF THE PREFERRED EMBODIMENTS

Figure 1B:
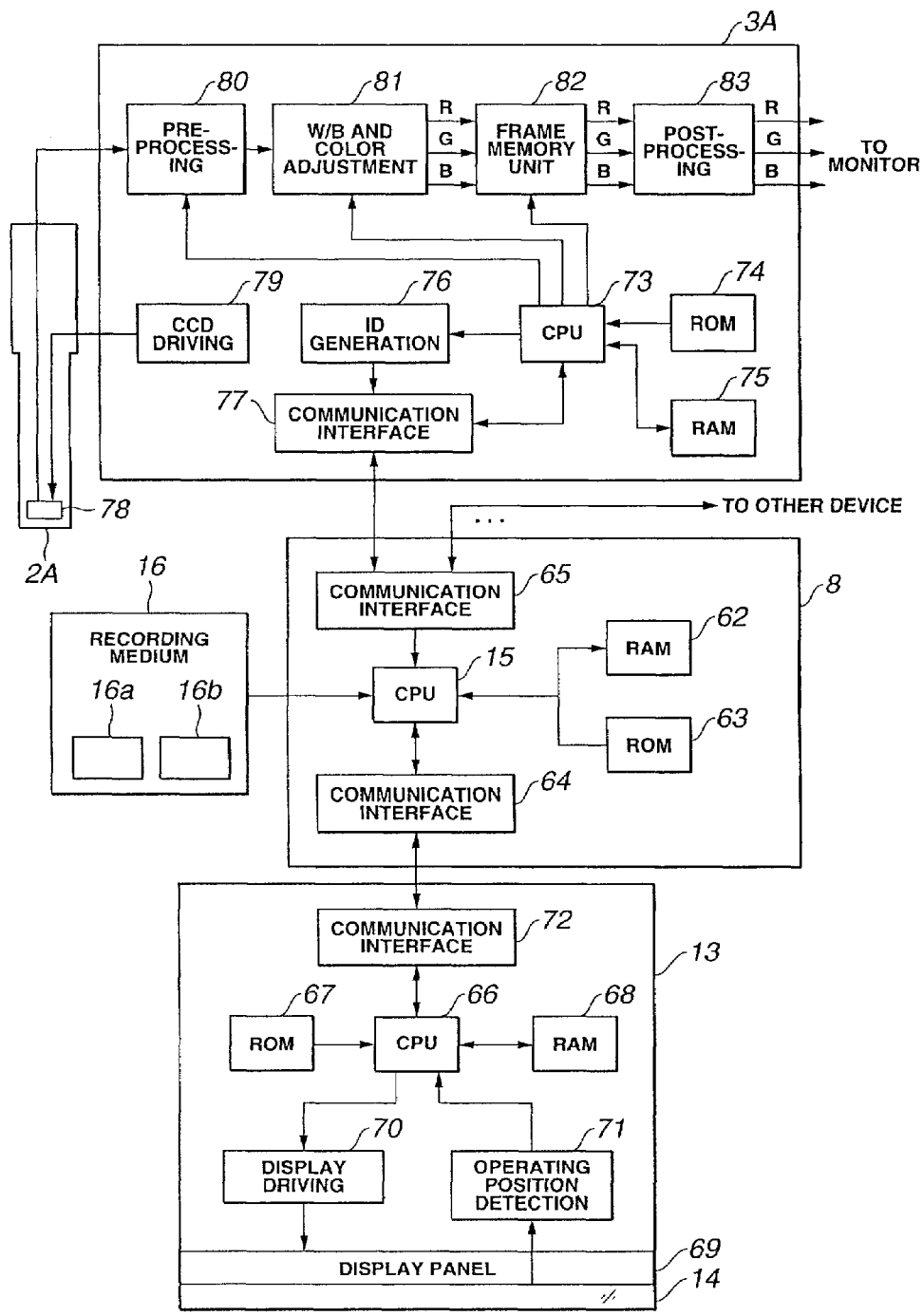
FIG. 1B is a block diagram illustrating a system controller and other components.

Embodiments of the present invention will be described with reference to the drawings.

(First Embodiment)

The first embodiment of the present invention will be described with reference to FIGS. 1A through 14.

The medical device system 1 shown in FIG. 1A comprises an endoscope system for performing surgery under endoscope observation, for example. This endoscope system comprises a (first) endoscope 2A having image-pickup means, a (first) TV camera device (1) 3A to which the endoscope 2A is connected for performing signal processing with regard to the image-pickup means (also called a camera control unit), a (first) light source device (1) 4A for supplying illumination light to the endoscope 2A, a (first) monitor (1) 5A to which the TV camera device (1) 3A is connected for displaying endoscope images, a pneumoperitoneum device 6 for performing pneumoperitoneum, a high-frequency cauterization device (electrically-driven scalpel) 7, a system controller 8 to which these devices are connected, a (second) TV camera device (2) 3B for processing signals of an unshown (second) endoscope connected thereto and a (second) light source device (2) 4B for supplying illumination light to the (second) TV camera device (2) 3B, wherein the (second) TV camera device (2) 3B and (second) light source device (2) 4B are connected to the system controller 8 via a relay unit 9, a (second) monitor (2) 5B to which the (second) TV camera device (2) is connected for displaying endoscope images, a video printer 11 for printing pictures displayed on the monitor (2) 5B for example, a video cassette recorder (VCR) 12 for recording the picture, and a control panel 13 connected to the system controller 8, for controlling and operating the devices via the system controller 8, specifying trouble items in the event that trouble has occurred, centralized displaying of countermeasure information and the like for recovering from the trouble, and so forth.

Also, the system controller 8 is connected with a communication interface 18, and is capable of performing communication with external devices via an unshown communication line.

Also connected to the system controller 8 are an unshown still image intake device, image mixer (image selecting device), and so forth.

An operation touch panel 14 is provided on the upper face (front face) of the display face for displaying information of the control panel 13, and in the event that a user touches the touch panel 14, signals detecting the point where the user touched are sent to the system controller 8, and a central processing unit (CPU) 15 making up the system controller 8 performs corresponding actions.

Also, the CPU 15 is connected to a recording medium 16 such as an EEPROM or the like (this may be a hard disk device as well) storing a control program (operating program) for performing the control actions, and controls the entire system 1 following the control program thereof.

The CPU 15 of the system controller 8 performs communication with the devices connected to the system controller 8 via connection lines connected to each of the devices, and thus performs centralized control thereof.

FIG. 1B illustrates the internal configuration of the system controller 8 shown in FIG. 1A and the control panel 13 and one of the medical devices, e.g., the TV camera (1) 3A.

The system controller 8 is connected to the recording medium 16 storing a program for controlling the medical devices, comprising the CPU 15 for controlling the overall system 1, RAM 62 connected to the CPU 15 via a bus for use as a temporary storage for information or as a work area, ROM 63 used for recording information, a communication interface 64 which performs interactive communication with the control panel 13, and a communication interface 65 which performs interactive communication with multiple medical devices.

Also, the control panel 13 comprises a CPU 66 which performs control of the components of the control panel 13, ROM 67 storing action programs and the like for the CPU 66, RAM 68 storing information for performing display and the like, a display driving circuit 70 for driving a display panel 69 with liquid crystal, an operation position detecting circuit 71 for detecting operation position detecting switches disposed at various locations on the touch panel 14 and outputting to the CPU 66, and a communication interface 72 for performing interactive communication with the system controller 8.

Figure 2:
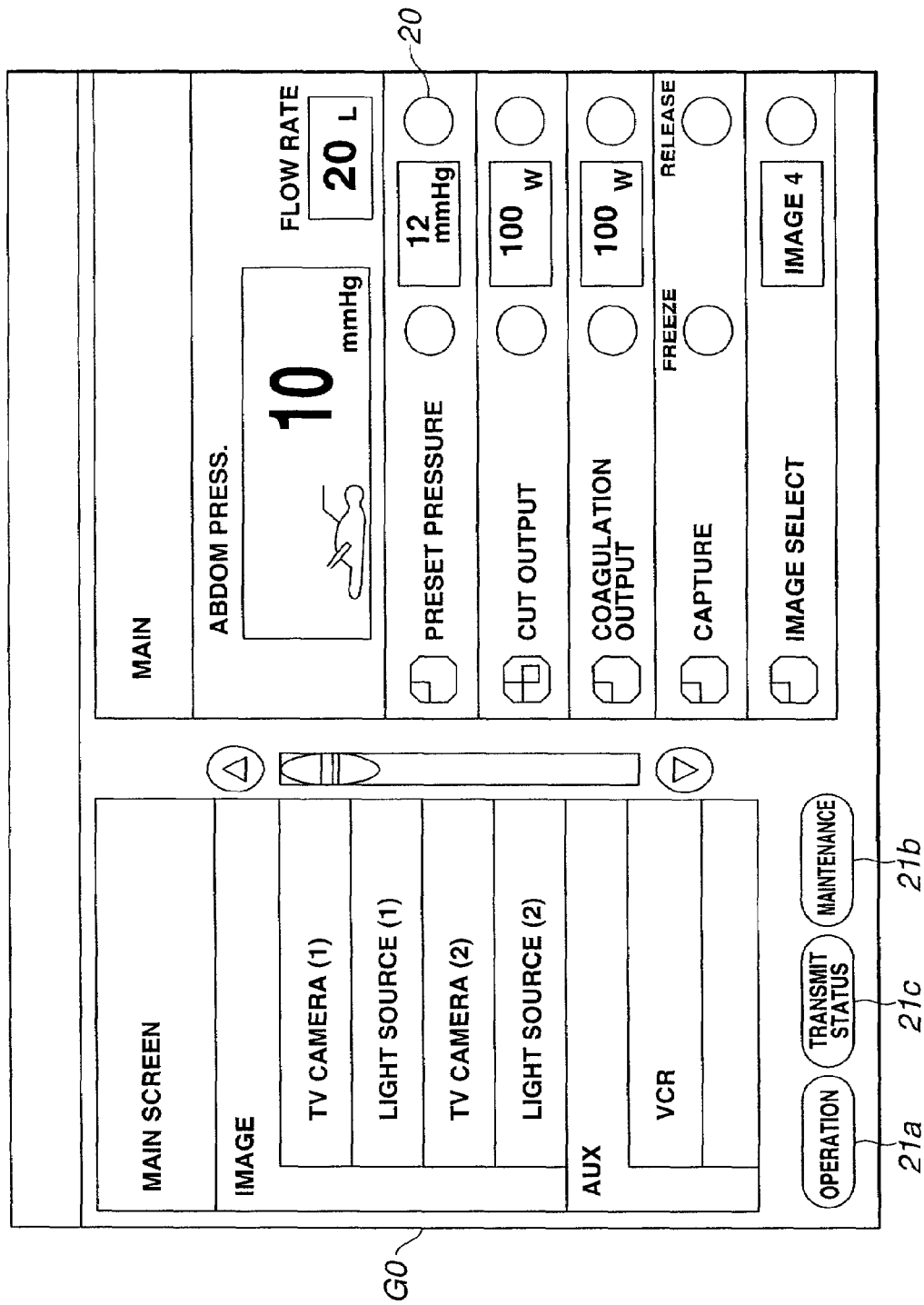

The CPU 15 of the system controller 8 sends information necessary for display to the side of the CPU 66 of the control panel 13 via the communication interfaces 64 and 72, with the display panel 69 of the control panel 13 being able to display this information. For example, information regarding the primary medical devices connected to the system controller 8 is displayed on the display panel 69 at the time of activation, as shown in FIG. 2, for example.

Also, upon an operation of a finger touching an arbitrary position on the touch panel 14 formed of transparent electrodes and the like disposed on the front face of the display panel 69, the touched operating position is detected by the operation position detecting circuit 71 and sent to the CPU 66, and in the event that the operating position is a button or switch corresponding to a specific function, the CPU 66 sends information to the effect that the button or switch has been operated, to the side of the CPU 15 of the system controller 8. The CPU 15 then performs the corresponding controlling actions.

Also, the TV camera (1) 3A comprises a CPU 73 for controlling the actions of the entire TV camera (1) 3A, ROM 74 storing control programs for the CPU 73, RAM 75 used for storing information and so forth, an ID generating circuit 76 for generating identification information for the device, and a communication interface 77 for performing interactive communication with the system controller 8.

Also, the TV camera (1) 3A comprises a driving circuit 79 for driving a solid-state image-pickup device built into the endoscope 2A, specifically a charge coupled device 78 (abbreviated as "CCD"), a pre-processing circuit 80 for subjecting output signals, which are photo-electrically converted by the CCD 78, to pre-processing such as amplification, correlated dual sampling and so forth, and color separation and the like, a monotone and color adjustment circuit 81 for performing white balance processing, color adjustment processing, and so forth, on the RGB signals output from the pre-processing circuit 80, a frame memory unit 82 for performing A/D conversion and storing the output signals, and a post-processing circuit 83 for performing D/A conversion on the output signals of the frame memory unit 82 and outputting RGB signals.

Also, amplification gain by the pre-processing circuit 80, the white balance processing and color adjustment processing by the monotone and color adjustment circuit 81, per-mitting or forbidding writing picture data to the frame memory unit 82, and so forth, can be controlled by control signals from the CPU 73.

Also, the information in the controlled state is stored and held in the RAM 75, and is also transmitted to the system controller 8 side by the communication interfaces 77 and 65, and information regarding the state (status) thereof is stored in the RAM 62 and so forth, for example. Thus, the CPU 15 of the system controller 8 can comprehend the state of the TV camera (1) 3A.

The other medical devices have the functions denoted by reference numerals 73 through 77, while the reference numerals 80 through 83 depend on the functions of the medical device. Note that the ID of the ID generating circuit 76 differs from one medical device to another, so the system controller 8 can judge the type of device by the ID being transmitted thereto.

Also, recording the status information of the devices in the RAM 62 or the like allows the CPU 15 of the system controller 8 to comprehend the status of the medical devices by making reference to the information thereof.

Also, the medical devices can be controlled in a centralized manner via the system controller 8, by operating the control panel 13.

In addition to being stored in the RAM 62 at the point of activation, the status information of the devices is updated in the event that settings are changed by the control panel 13 or the like, and accordingly, the CPU 15 can always comprehend the status information by reading the information out from the RAM 62 or the like. Also, the contents displayed on the control panel 13 are changed.

Also, the recording medium 16 stores a processing program 16b along with a control program 16a, to handle errors or trouble in the event that errors or trouble occur in the system 1, as described below (see FIG. 1B).

In the event that an error occurs in the medical devices (equipment), and the system controller 8 detects the error via a connection line, the system controller 8 displays the error message thereof on the display screen of the control panel 13.

With the present embodiment, the CPU 15 recognizes the connected device, comprehends the status of the device, and displays a normal operating screen (main screen) G0 indicating the status of the primary connected devices, as shown in FIG. 2, on the control panel 13.

This main screen G0 displays, as image-related items, the TV camera (device) (1) 3A, light source device (1) 4A, TV camera (device) (2) 3B, light source device (2) 4B, and a VCR 12 for example connected as an external device. The right side of the screen shows the abdominal pressure, the flow and the present pressure from the pneumoperitoneum device 6, the cutting output and the coagulation output thereof from the electrically-driven scalpel 7, freeze and release buttons for an unshown still image intake device, and the image selection state by an image mixer, and so forth.

Also, with this main screen G0, operating an operating button 20 displayed along with the abdominal pressure item of the pneumoperitoneum device 6 causes the operation at that position to be detected by the touch panel 14 and sent to the CPU 15, and the CPU 15 variably sets the abdominal pressure by controlling the pneumoperitoneum device 6 accordingly. Operating another operation button 20 can raise or lower the cutting output. That is to say, the CPU 15 performs centralized control of the actions of the pneumoperitoneum device 6 and the like which are devices connected to the system controller 8 so as to be controlled thereby.

Also, displayed at the bottom left side of the main screen G0 are an operation button 21a for returning to the normal screen, and a maintenance mode switch-over button (hereafter simply referred to as "maintenance button") 21b for specifying selection of maintenance screen or trouble items. Also, in FIG. 2 and other drawings, a status transmission button 21c for transmitting system status is shown. This status transmission button 21c does not function in the event that the system 1 is not connected to external devices via a communication interface 18. Operations with an external device connected via a communication interface 18 will be described later with the second embodiment.

Figure 3:
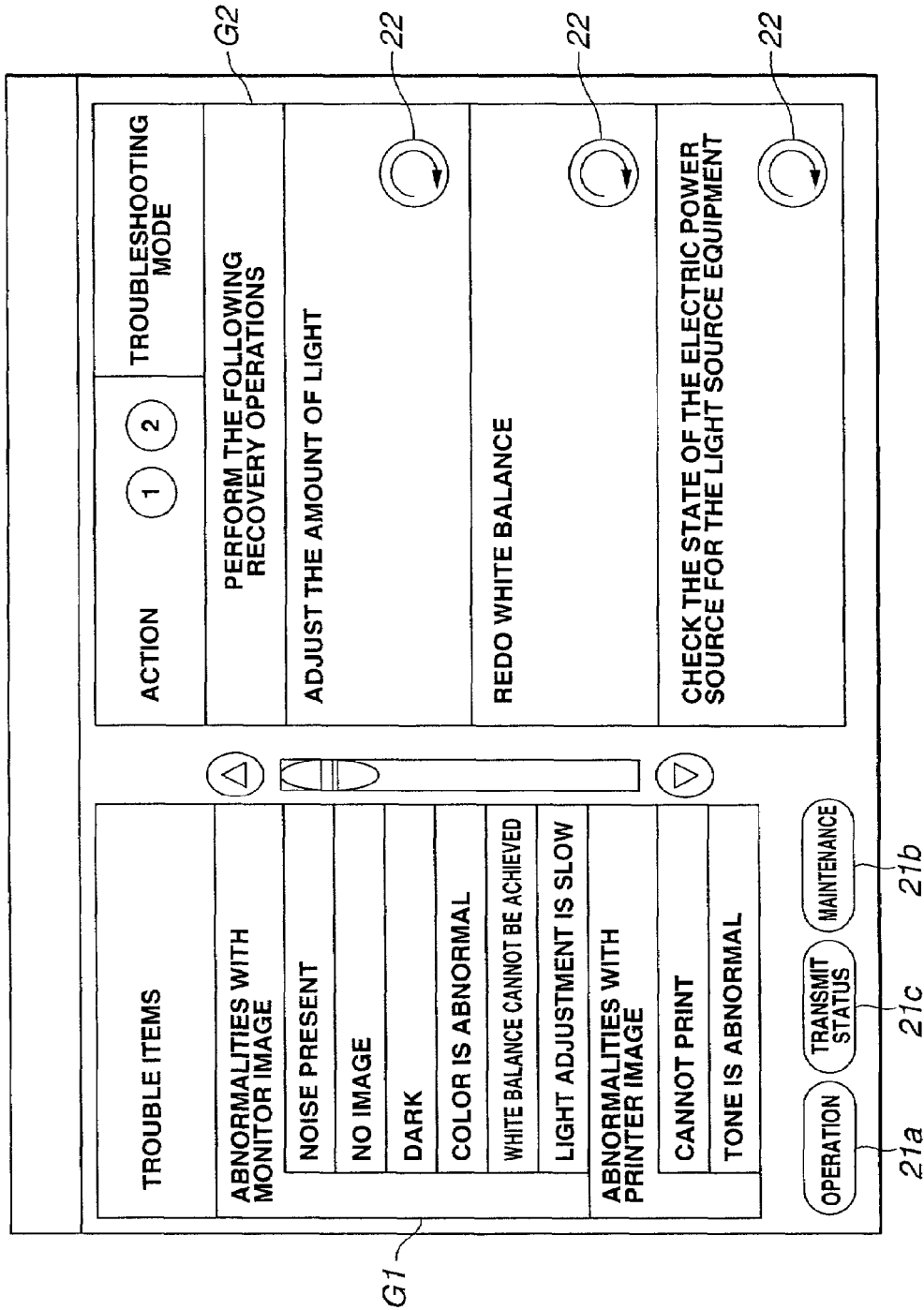

In the event of performing maintenance, pressing the maintenance button 21b brings up a menu window screen G1 displaying trouble items, such as shown in FIG. 3. In this case, the right portion of FIG. 3 is not yet displayed.

In the event that trouble items are to be displayed with the menu window screen G1 shown in FIG. 3, display is made in a hierarchical manner, divided into primary items.

For example, the major trouble items such as monitor image abnormalities, printer image abnormalities, and so forth, contain a great number of lower-order items belonging to the major trouble items, which are more specific trouble sub-items such as noise, no image, and so forth.

Also, though the arrangement in FIG. 3 shows the major trouble items and the many trouble sub-items belonging to the major trouble items therein, but an arrangement may be made wherein only the major trouble items are displayed, with the many trouble sub-items belonging to a specified major trouble item being displayed only in the event that the major trouble item is selected. Also, an arrangement may be made wherein the user can select between either of the display methods.

Specifying an item in the main window screen G1, either by touching the position of a trouble item or by another means, displays a countermeasures screen for solving or recovering from the trouble item, i.e., a trouble recovery window screen G2, at the right side. In this trouble recovery window screen G2, the encircled numerals 1 and 2 indicate that there are two screens.

In the event that a trouble item is specified by selection as described later, the CPU 15 performs processing for estimating the cause of the occurrence of that trouble item, performs processing for estimating the recovery operation or operation method or the like for recovering from that trouble item based on the processing results, and displays the information of the processing results on the control panel 13. That is to say, the CPU 15 performs processing for estimating the recovery operation or operation method or the like for recovering from the trouble item.

In the case shown in FIG. 3, the troubleshooting in response to the item specified, which is the item stating that the monitor is too dark, for example, consists of countermeasures such as to adjust the amount of light (of the light source device), and of jump switches 22 provided at the display portions thereof.

The user operates the jump switches 22 displayed there in order to perform the proper operations following the display of the trouble recovery window screen G2.

Figure 4:
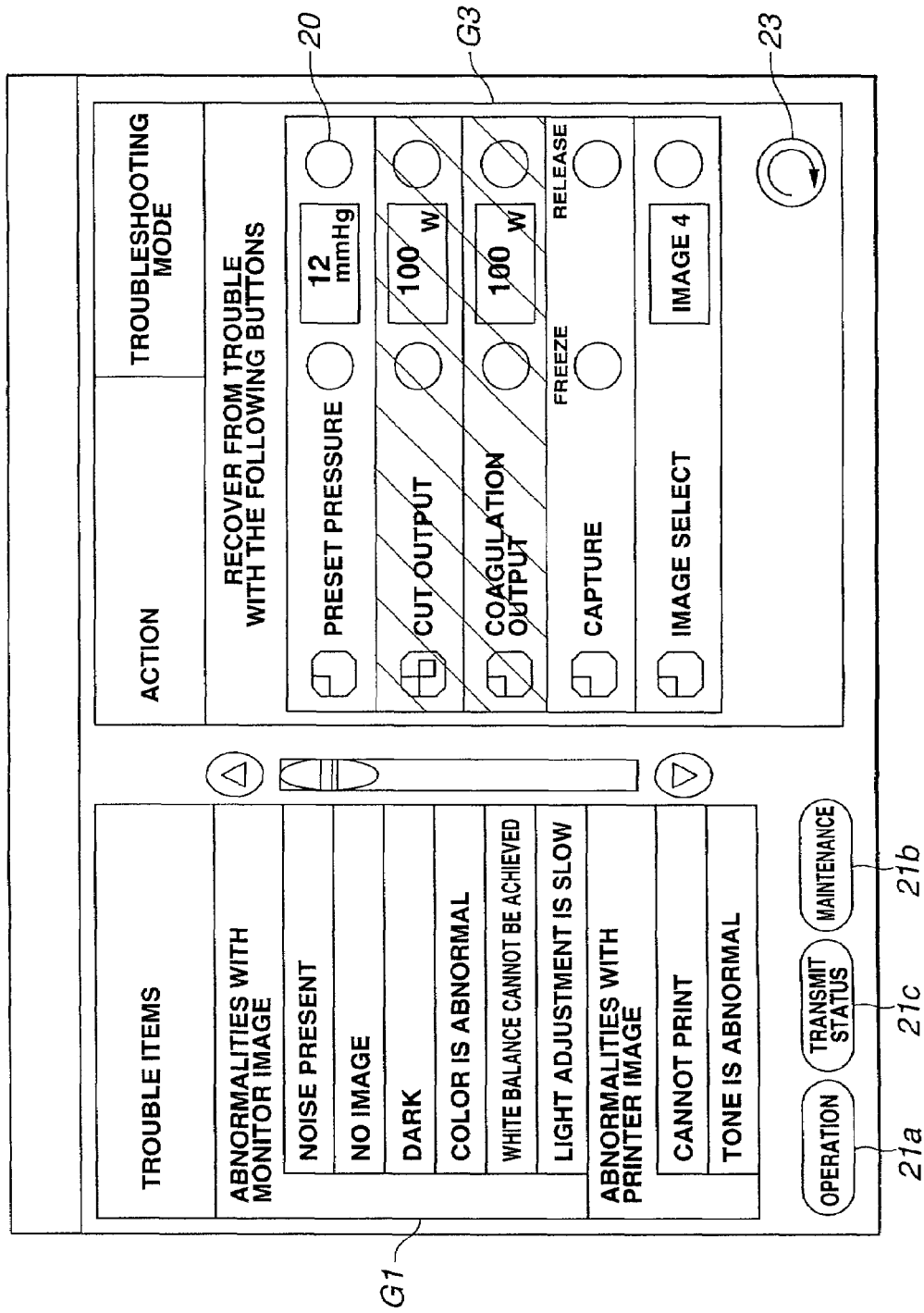
Figure 5:
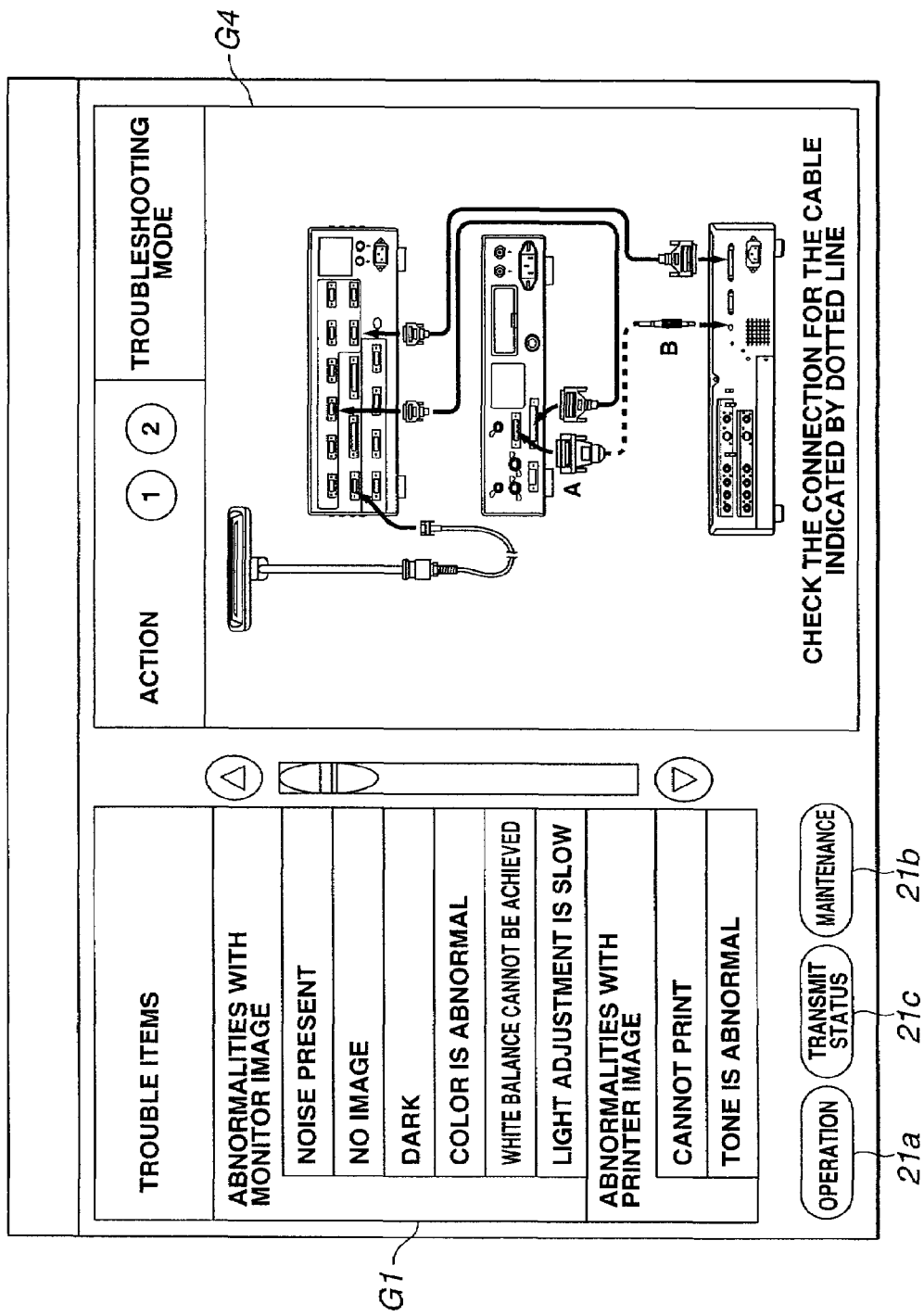

This brings up a recovery operation screen G3 shown in FIG. 4 for performing recovery operations according to the contents of the measures, or an advice screen G4 shown in FIG. 5 instructing the recovery operation method or advice information.

The recovery operation screen G3 displays operation information such as operation buttons 20 or the like thereby the trouble item can be recovered from by directly operating.

That is, in the recovery operation screen G3, performing touching operations of the portions of the instructed operating buttons 20 sends the operation from the control panel 13 to the CPU 15, and the CPU 15 controls actions of the device corresponding to the operation. Thus, there is the possibility that the trouble item may be recovered from.

Note that the contents of the trouble recovery window screen G2 in FIG. 3 and the displayed contents relating to trouble in the screens in FIGS. 4 and 5 are not directly related.

In the event that operating the operation button 20 or the like in the recovery operation screen G3 does not solve the trouble item, operating the return button 23 displayed in the screen G3 allows returning to a screen one level higher in the hierarchical structure, i.e., returning to the screen G2 shown in FIG. 2, so other measures can be taken in a speedy manner.

Now, in the event that operating the operation button 20 or the like in the recovery operation screen G3 does not solve the trouble item, and in the event that the operation of the operation button 20 or the like has changed the setting state of the device and the setting state of the system 1 operating the return button 23 cancels the settings of the operation button 20 and the like and returns the state thereof to that prior to the operation made.

Also, the recovery operation screen G3 shown in FIG. 4 illustrates the operation buttons and the like unrelated to resolving the trouble item as hatched areas, and even in the event that the user operates these operation buttons, the operation is not accepted. Though these buttons are hatched in FIG. 4, an arrangement may be made wherein operation buttons unrelated to solving the trouble item are not displayed at all.

FIG. 5 illustrates an advice screen G4 displayed in the event that trouble solving operations cannot be made with the operating buttons on the control panel 13. In this case, a connection diagram for example relating to solving of the trouble item of the system 1 is displayed, and an advice display is made to the effect of "please check the connection of the cable indicated by a dotted line", for example. Note that FIG. 5 illustrates a case of the trouble item wherein printing cannot be performed for example, indicating that the connectors A and B of a cable connecting between the TV camera and the video printer may not be correctly connected to the TV camera and the video printer.

Figure 6:
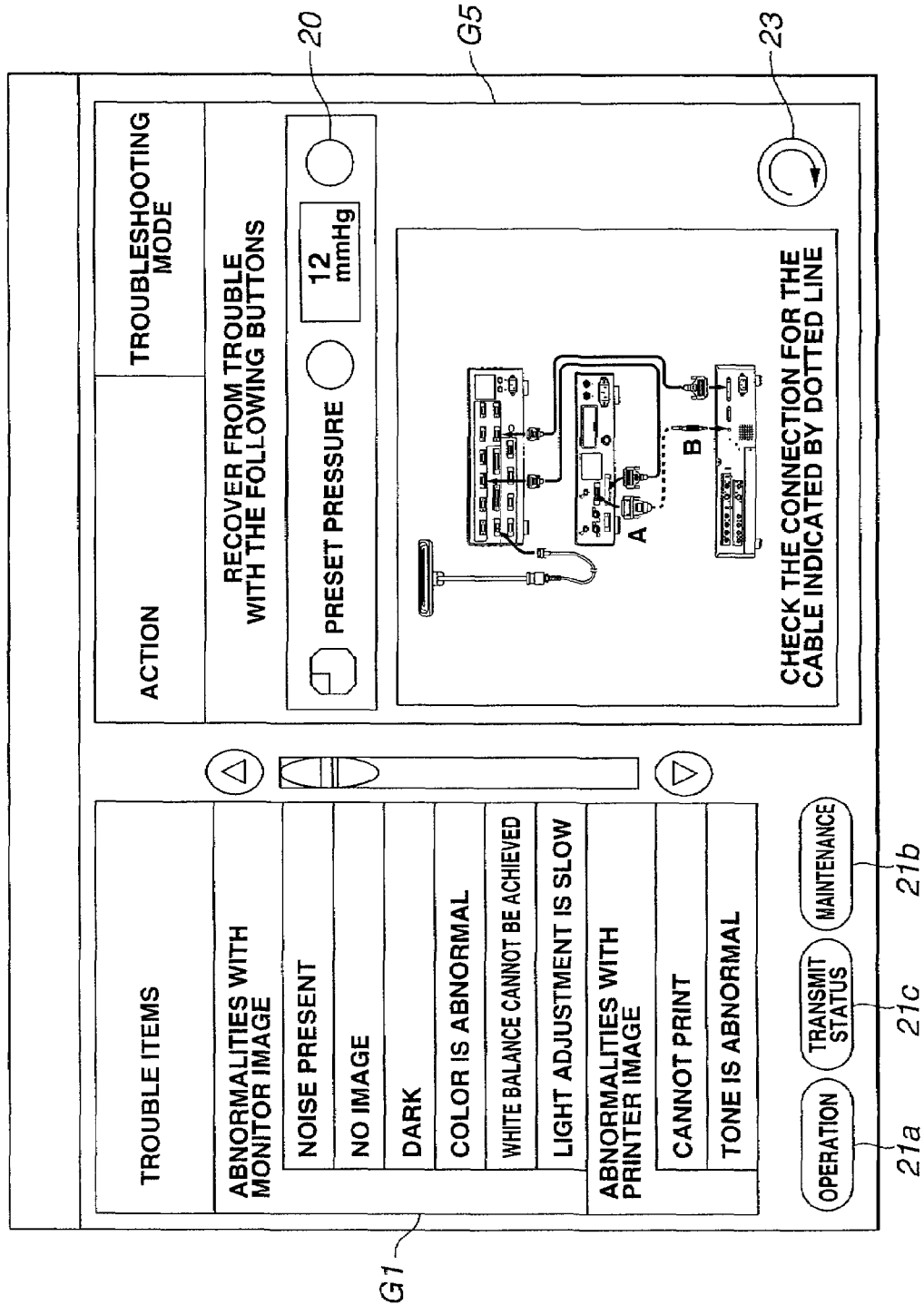

Now, this arrangement has been described with the understanding that transition is made from the display screen shown in FIG. 3 to that shown in FIG. 4 or 5 by trouble item countermeasures, but an arrangement may be made wherein the contents of FIGS. 4 and 5 are displayed on the same screen. FIG. 6 illustrates a mixed screen G5 displayed with such an arrangement. With this mixed screen G5, an operating screen containing at least one operation button to be operated for solving the trouble item is displayed along with a reduced connection diagram for example relating to solving of the trouble item in a simultaneous manner, and the advice display to the effect of "please check the connection of the cable indicated by a dotted line", for example, is also given.

Figure 7:
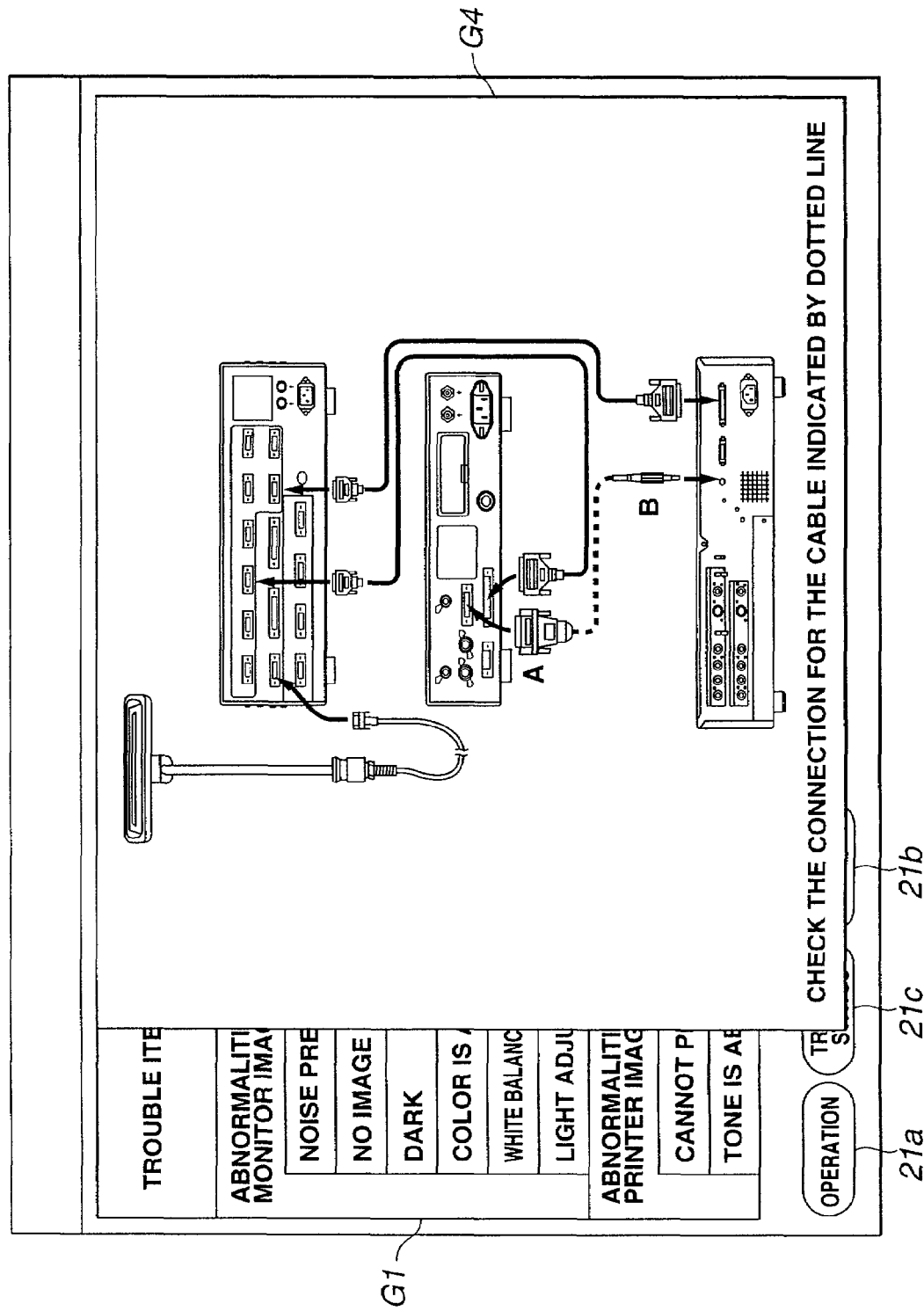

Also, in the event of displaying a connection diagram as the advice screen G4 as shown in FIG. 5, the connection diagram serving as the advice screen G4 may be displayed in an enlarged manner as shown in FIG. 7, in the event that the portion to be displayed is too complicated, or in order to facilitate understanding of the displayed diagram.

Figure 8:
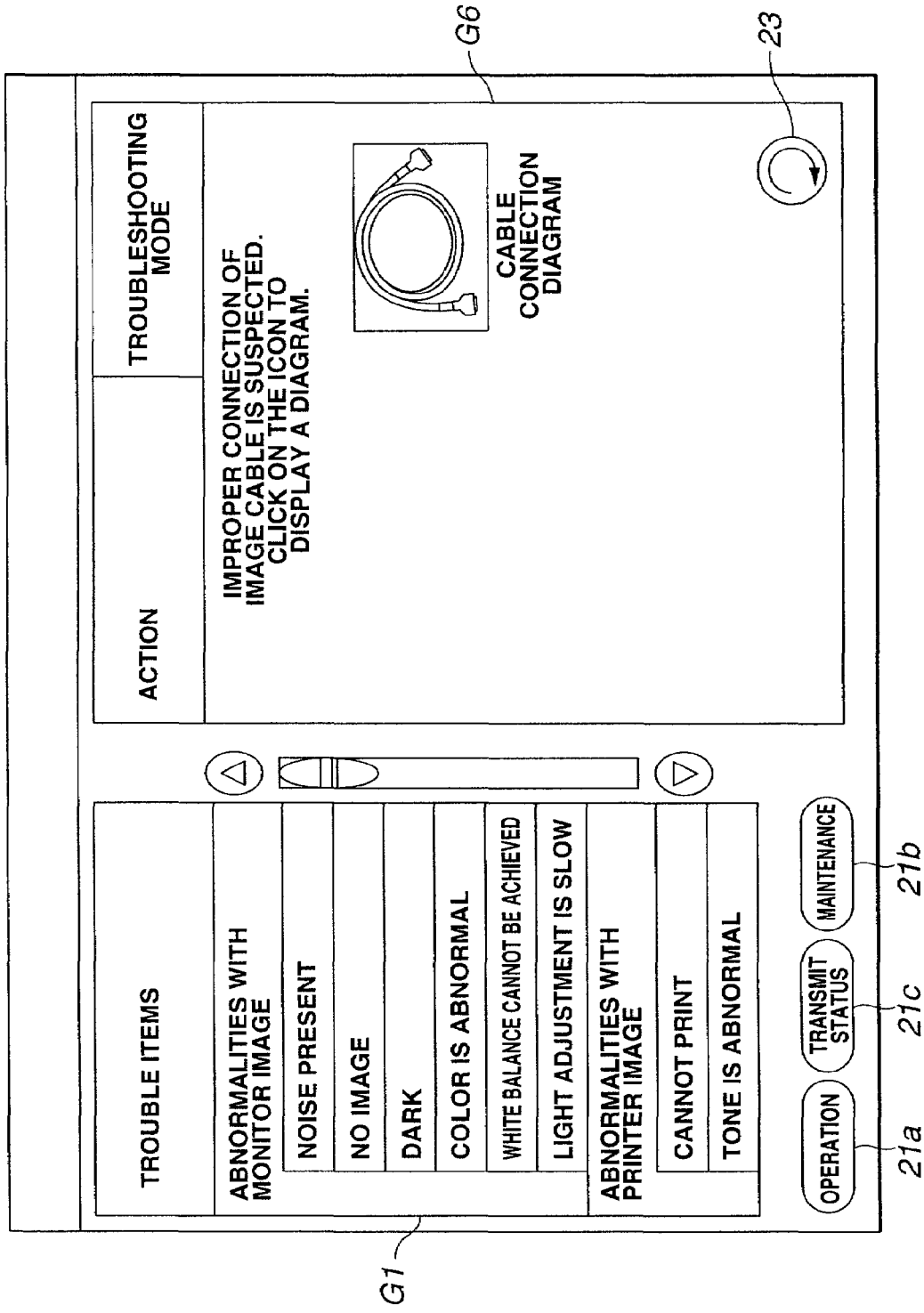

Also, in the event of displaying the advice screen G4 shown in FIG. 5, an arrangement may be made wherein a screen G6 shown in FIG. 8 is displayed beforehand indicating an icon, such that clicking (touching) the icon displays a connection diagram containing the picture cable corresponding to the icon, and shown in FIG. 5 and so forth. Also, an arrangement may be made wherein, instead of displaying a reduced connection diagram shown in FIG. 5, an icon of a cable shown in FIG. 8 is substituted. Also, in the event of displaying connection diagrams of multiple places for example, thumbnails or the like wherein the connection diagrams of multiple places are displayed in a reduced manner, may be substituted.

Thus, with the present embodiment, a menu window screen G1 displaying trouble items is displayed, and upon a trouble item being selected and specified from that display, the CPU 15 performs processing for estimating causes corresponding to that trouble item at the connected devices, and also displays information regarding countermeasure operations and methods for solving the causes, which is a primary characteristic of the present embodiment.

The operation of such a medical device system 1 will be described in further detail with reference to the flowchart shown in FIG. 9.

The devices to be used are connected as shown in FIG. 1A, and the power is turned on. This causes the CPU 15 of the system controller 8 to read out the control program recorded in the recording medium 16, and recognize the devices connected to the system controller 8.

Next, the main screen (normal operation screen) G0 shown in FIG. 2 is displayed on the display face of the control panel 13, so as to display information of the setting state of the primary devices, and perform operations such as making settings for controlling the actions of the primary devices, and so forth.

In this case, the CPU 15 distinguishes the types and functions of the connected devices by the ID information and the like of the devices, via the connection lines whereby the devices are connected to the system controller 8. The CPU 15 also can read out the setting statuses of the devices, transmit control information to devices which can be controlled from the control panel 13, and perform initialization settings and so forth. Also, the user can operate the operation buttons 20 provided on the control panel 13 to increase or decrease setting values.

Figure 9:
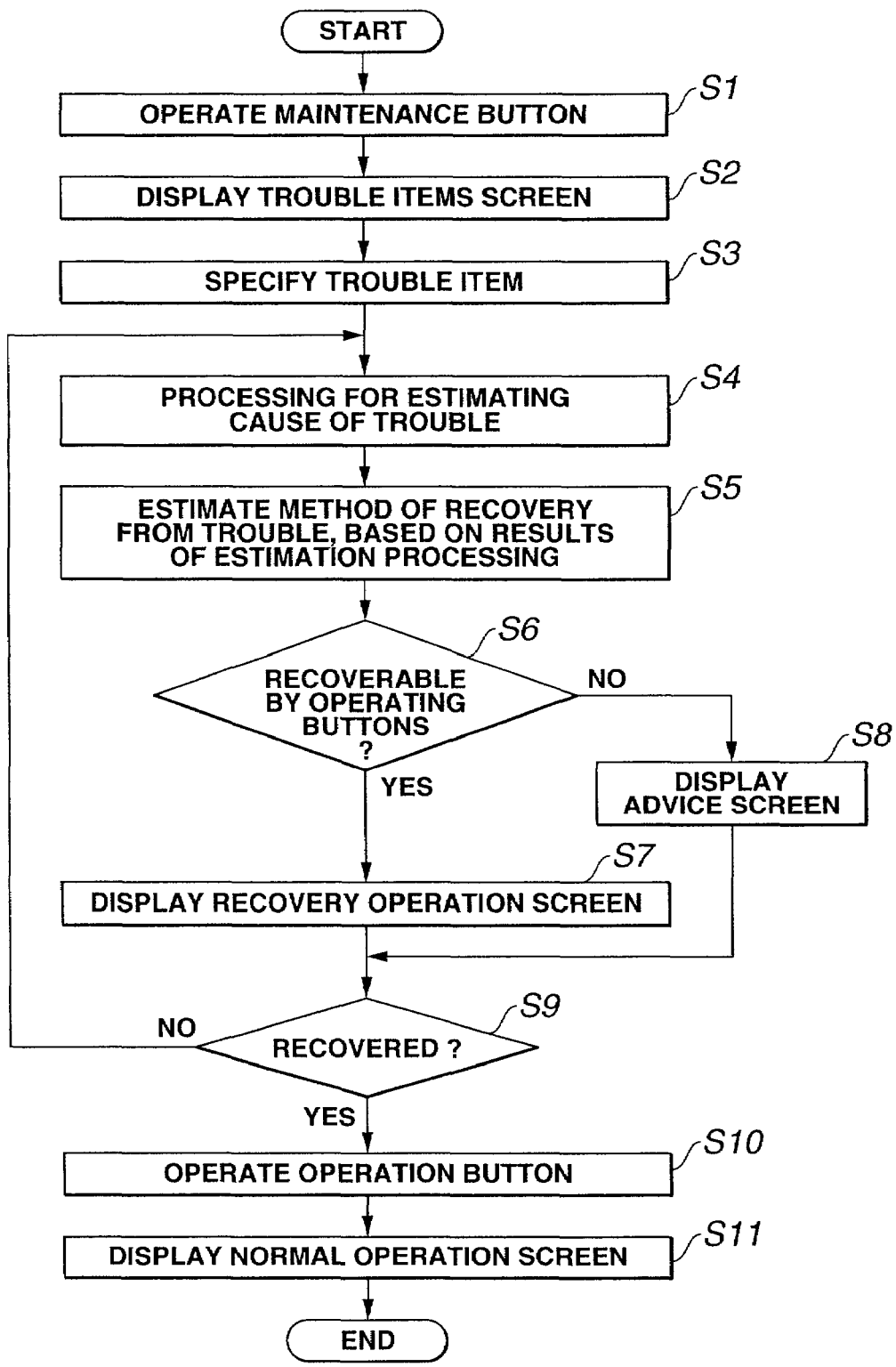

In the event that a condition suspected of being trouble occurs during use of the system 1 or at other times, the user presses the maintenance button 21b (displayed on the main screen G0 shown in FIG. 2) as shown in step S1 in FIG. 9.

This causes the screen to change from the main screen G0 shown in FIG. 2 to a screen displaying trouble items in step S2, i.e., to change to the display of the menu window screen G1 shown in FIG. 3.

In the menu window screen G1 shown in FIG. 3, the user specifies a trouble item as indicated by step S3. Specifically, in the menu window screen G1, the user checks for a general trouble item from the major trouble items, and then selects a trouble sub-item which more specifically matches the trouble, and touches this item to specify the trouble sub-item.

By specifying the trouble sub-item, the control panel 13 sends contents specified thereby to the CPU 15.

Then, as indicated by step S4, the CPU 15 performs estimation processing for estimating the cause of occurrence of the trouble item from the specified trouble item.

For example, in the event that a trouble item is specified stating that the monitor screen is dark, estimation of causes for the trouble item to occur is made for the power source systems, light source systems, signal processing systems, and image display systems, etc., in the medical device system 1 to which the multiple controlled devices such as the TV camera (1) 3A, light source device (1) 4A, and so forth are connected.

For the purpose of this estimation, recognition of the devices connected as the medical device system 1, and information (data) regarding the functions and the configuration and the like of the devices, are recorded in the recording media 16 or the like beforehand, and this information is used to perform the estimation processing for the cause.

In this case, the CPU 15 may prompt further specification or selection of more detailed trouble items such as shown next, so that more specific cause estimation can be made from the system configuration.

(a) Only the image on monitor (1) is dark.
(b) Only the image on monitor (2) is dark.
(c) The images on both monitor (1) and monitor (2) are dark.

In the event that (a) is selected and specified, for example, from the above multiple trouble item selection specifications, the output setting state of the illumination light of the light source device (1) 4A which contributes to display of images on the monitor (1) 5A which is displaying a dark image, the setting state of the signals processing for the TV cameral (1) 3A, and the connection state and the like of the connection cable between the TV camera (1) 3A and the monitor (1) 5A, are estimated as causes (which have a high probability of causing the trouble item).

Also, in the event that (c) is selected and specified, estimation is made that there is a high probability that the light source systems and signals processing systems are both set to setting states for dark images.

Following making the estimation of these causes, the CPU 15 performs estimation processing for methods and means and so forth for recovering from the trouble, item as the subsequent step S5.

For example, in the case of (a), estimation is made that there is a high probability of recovering from the trouble item by setting the output setting state of the illumination light of the light source device (1) 4A, the setting state of the signals processing for the TV camera (1) 3A, and the connection state of the connection cable between the TV camera (1) 3A and the monitor (1) 5A, so as to be the same as those of the devices contributing to display of images on the monitor (2) 5B.

Then, information of the recovery method and the like is displayed according to the estimation results. In this case, judgment is made as indicated in step S6 whether the operations for recovering can be made by operating an operation button 20 (shown in FIG. 2) provided on the control panel 13 or by operating other switches or the like not shown in FIG. 2, or whether other operations or work is necessitated.

In the event that the trouble can be recovered from using the operation button 20, a recovery operation screen displaying the operation button 20 or the like is displayed, as indicated in step S7. For example, in this recovery operation screen, in the event that control can be made from the control panel 13, an increase control button for increasing the amount of light of the light source device (1) 4A is displayed on the display face of the control panel 13, such that the CPU 15 increases the amount of light by operation thereof, or a gain increase control button for increasing gain of the TV camera (1) 3A is displayed, so as to increase the gain in the event that this is operated. Thus, recovery from the trouble item is attempted.

In the event that the CPU 15 cannot control increasing of the amount of light of the light source device (1) 4A and so forth via the control panel 13, an increase control button or the like for increasing the amount of light of the light source device (1) 4A is displayed along with advice or instructions to perform that operation.

On the other hand, in the event that the trouble is of a type which cannot be recovered from by operating the operation buttons, an advice screen for performing the work is displayed, as indicated in step S8. In this advice screen, a connection diagram or the like to the effect of "please check the connection state of the connection cable between the TV camera (1) 3A and the monitor (1) 5A" is displayed, and a display is made (advice is given) to facilitate the work.

Following performing the steps S7 or S8, the CPU 15 prompts the display face of the control panel 13 regarding whether the trouble item has been recovered from or not (step S9). In the event that the trouble item has been recovered from, the user operates the operation button 21*a* (step S10), returns to the main screen (normal operation screen) (step S11), and ends the maintenance processing.

On the other hand, in the event that the trouble item has not been recovered from in the judgement in step S9, the flow returns to step S4, the CPU 15 takes into consideration the results of the recovery operations and the like, performs processing for estimating the cause, and estimates a method or the like for recovering from the trouble item, based on the processing results.

In this case, in the event that there are multiple operations and methods for recovering from the trouble item, and recovery is not effected by one of these, the same estimation processing as before is made at step S4, the estimation results whereby the trouble was not recovered from is eliminated in step S5, and step S6 and so on are performed with the remaining estimation results.

In the event that all operations and methods for recovering from the estimated trouble cause are exhausted but the trouble is still not recovered from, other causes are estimated in step S4, and recovery methods and the like for recovering therefrom are estimated in step S5 based on the estimation results.

Thus, according to such processing, causes with higher probability of causing the trouble are estimated, countermeasure methods and the like with higher probability of solving the trouble with regard to the estimation results are sequentially displayed with priority, and in the event that the trouble items is not resolved the results are taken into consideration and countermeasure methods and the like with lower probability are displayed, the user can easily solve the trouble by performing the operations and the like following the displayed screen.

Thus, according to the present embodiment, even in the event that trouble which is not detected has occurred, the trouble items are specified, estimation processing of countermeasure methods and the like for recovering from the trouble is performed, and the information of the countermeasure methods and the like is displayed, so trouble can be recovered from more easily and more readily by performing the operations and work and the like following the information displayed.

A first modification of the present embodiment will now be described. This first modification has the same configuration as that shown in FIG. 1A, but part of the operation program differs. Accordingly, some of the actions are different from those shown in the flowchart in FIG. 9. More specifically, the flow proceeds with maintenance processing screens corresponding to, for example, the level of experience of the user with regard to maintenance processing.

The operation thereof will be described with reference to the flowchart shown in FIG. 10. In the same manner as with FIG. 9, once the power is tuned on and started, a main screen G0 such as shown in FIG. 2 is displayed on the display face of the control panel 13.

Then, the maintenance button is operated as indicated in step S21, thereby activating the program for making transition to the maintenance screen.

Figure 11:
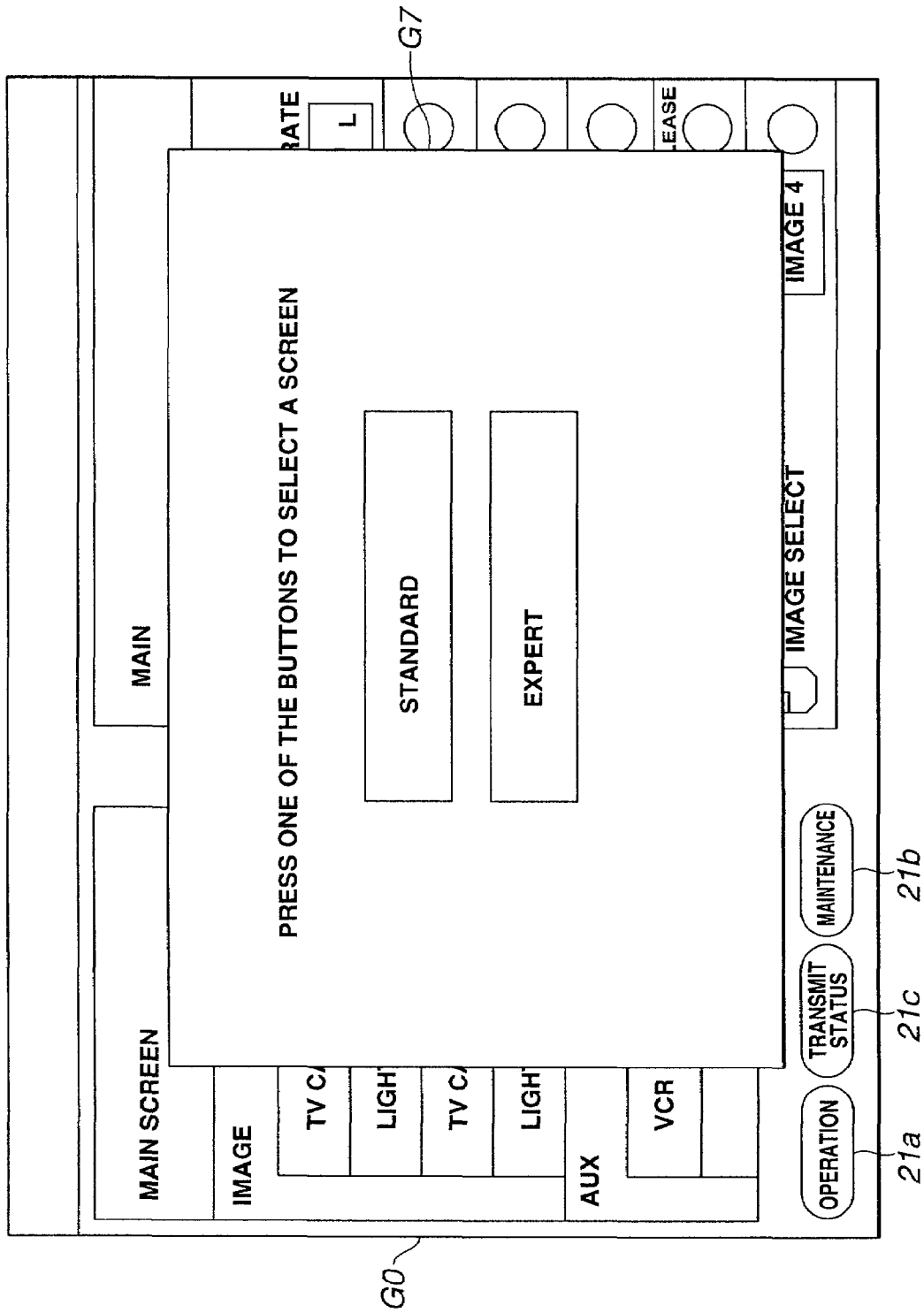

This brings up a selection screen G7 on the main screen G0 as shown in FIG. 11, for example, for selecting whether to proceed with the standard mode or whether to proceed with an expert mode (step S22).

That is to say, in the event of performing maintenance processing, the user can proceed with different display contents according to the level of experience with regard to maintenance processing.

Then, the CPU 15 makes judgment regarding whether or not the standard mode button has been selected (step S23), and in the event that the standard mode button has been selected, the screen displays a standard mode screen (step S24).

Figure 12:
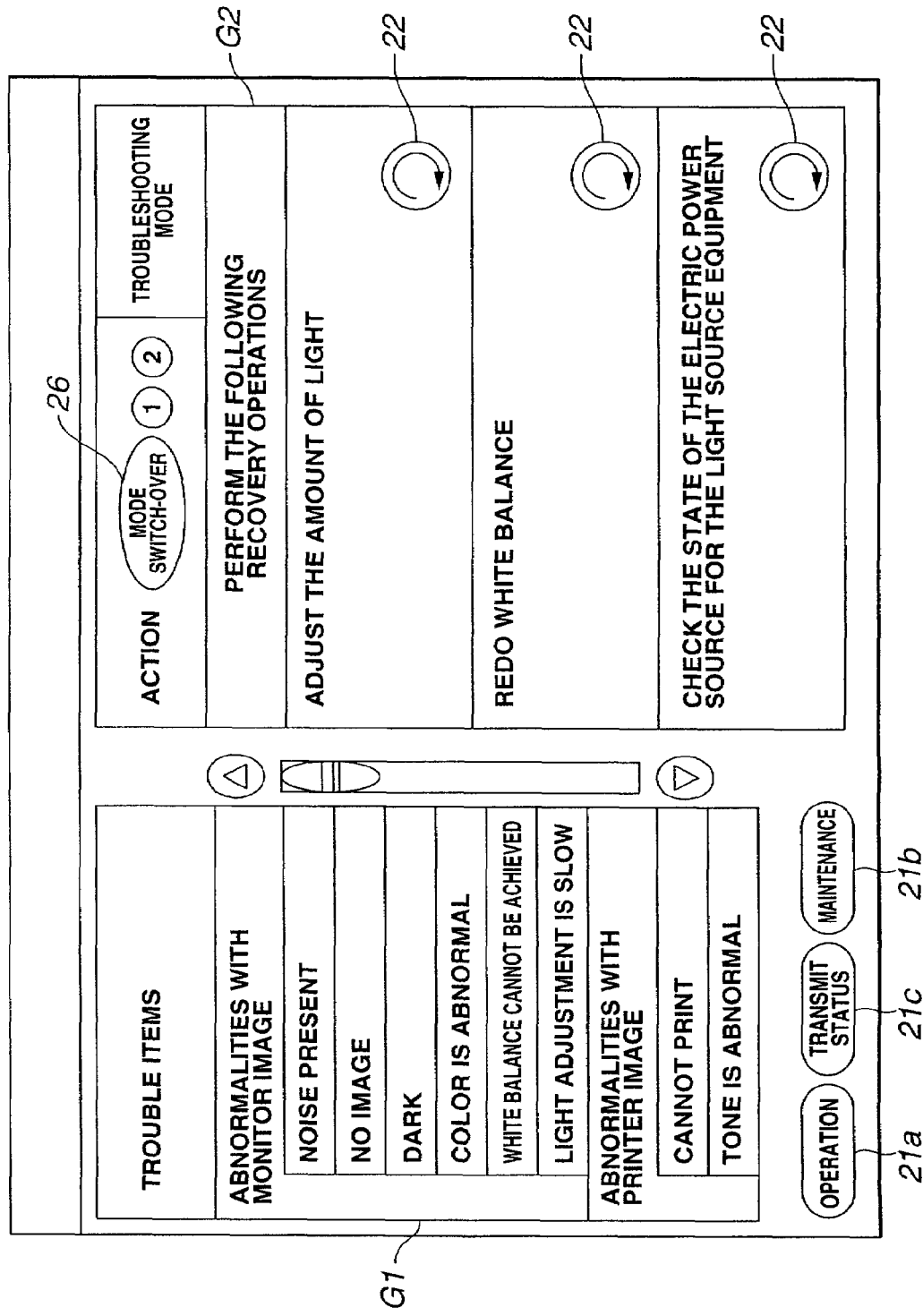

For example, a menu window screen G1 of display contents mode such as shown in FIG. 12 is displayed.

Note that the menu window screen G1 here is almost the same as the menu window screen G1 shown in FIG. 3. However, the menu window screen G1 shown in FIG. 12 has a mode switch-over button 26 for switching over to the expert mode, while the menu window screen G1 shown in FIG. 3 does not. Also, the trouble recovery window screen G2 shown to the left in FIG. 12 is also the same as that shown in FIG. 3, with a mode switch-over button 26 also displayed here at the top.

Figure 13:
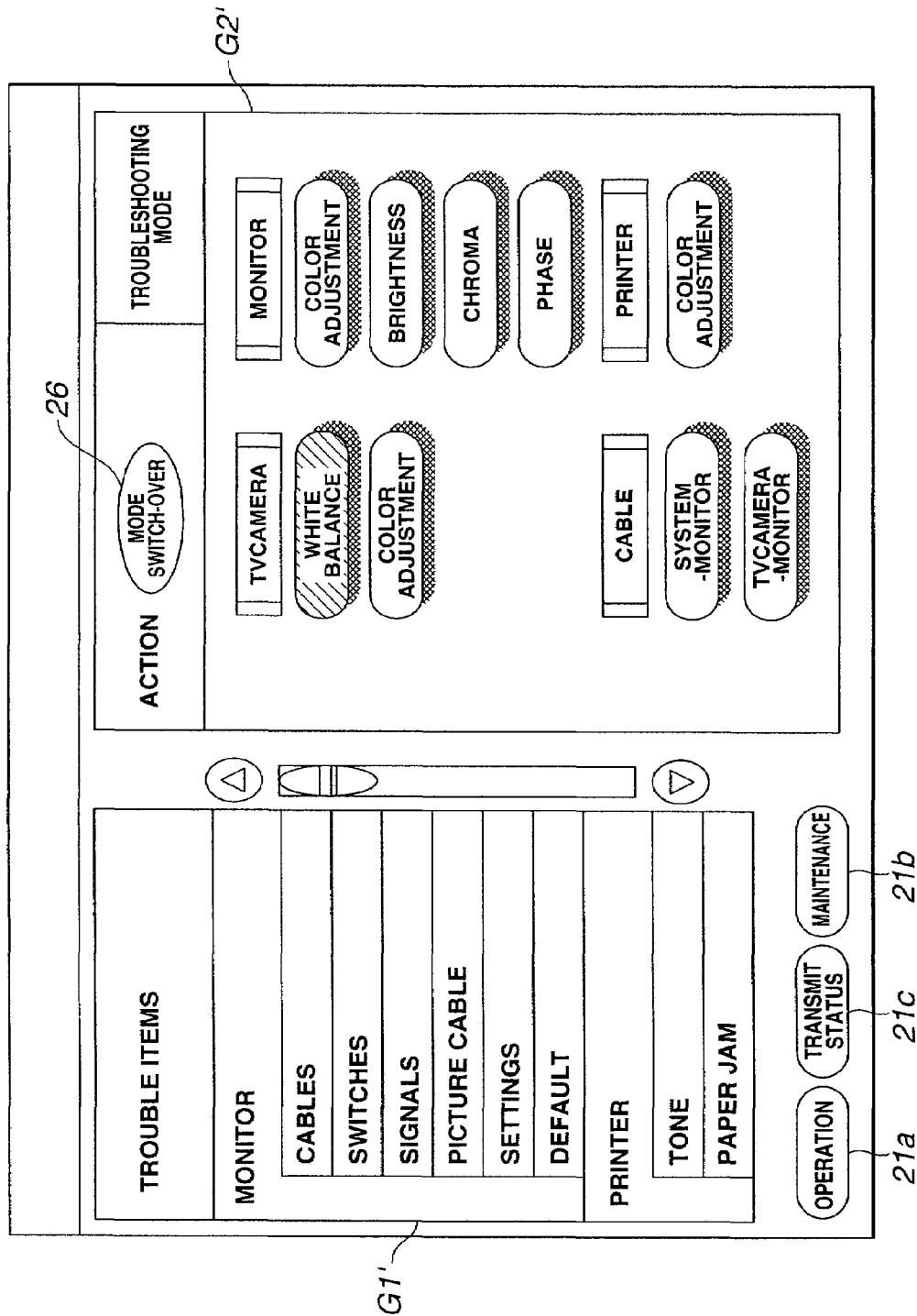

On the other hand, in the event that the user does not select the standard mode button, the screen displays an expert mode screen (step S24). That is to say, a menu window screen G1' with contents such as shown in FIG. 13 is displayed. In this case as well, a mode switch-over button 26 for switching over to the standard mode is displayed.

In the menu window screen G1', trouble items suitable for users more experienced with maintenance processing are displayed in a concise manner.

Also, specification of trouble items is displayed in both modes. For example, in the event of performing specification of trouble items in the menu window screen G1' shown at the left of FIG. 13, the trouble recovery window screen G2' is displayed to the left side thereof.

While the displayed contents of the present modification differ, the processing itself is performed in the same manner as that shown in FIG. 9.

According to the present modification, maintenance processing can be performed with display contents suitable to the situating depending on the degree of experience with maintenance processing. Other than that, the present modification has the same advantages as those of the first embodiment.

Figure 14:
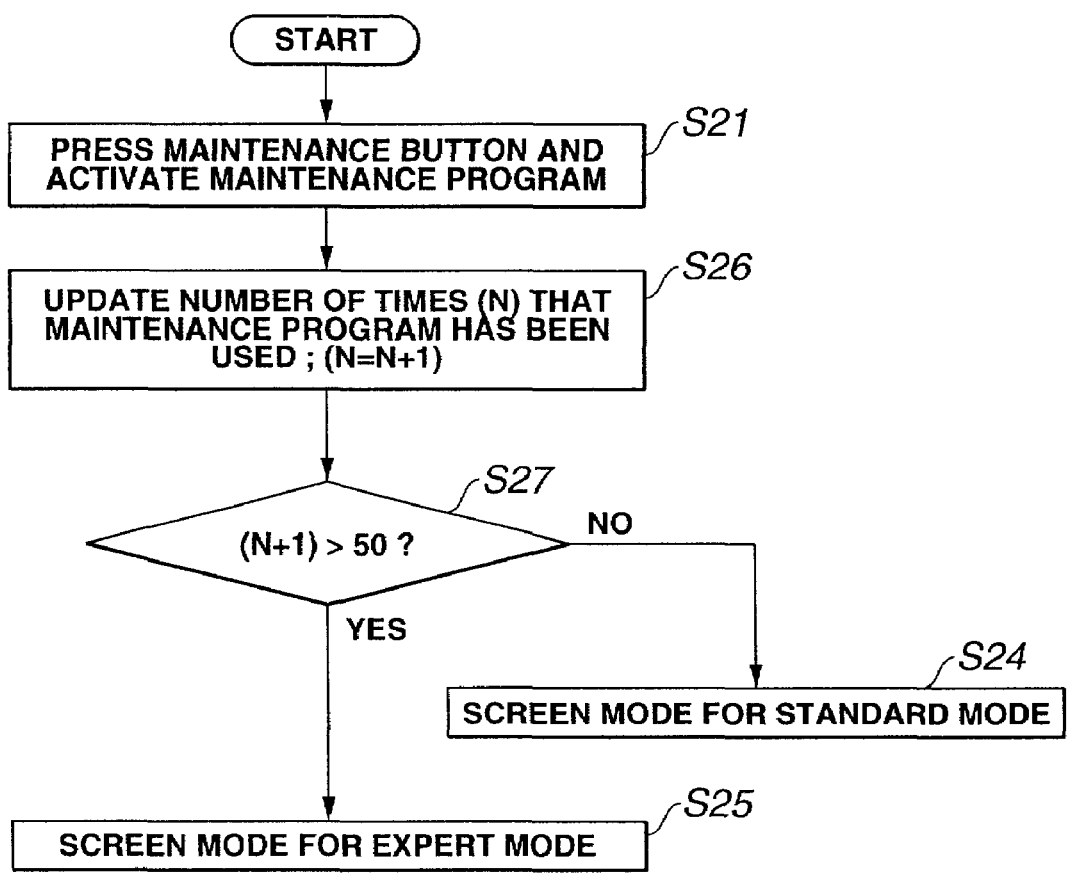

Also, a modification of the first modification can be made wherein the screen mode is set as shown in FIG. 14. That is, with the first modification, the user selects the screen mode, but with this modification, the CPU 15 stores the number of times that the maintenance button 21*b* has been operated for example, and the screen mode for performing maintenance may be automatically set based on the stored number of times or the like.

Figure 10:
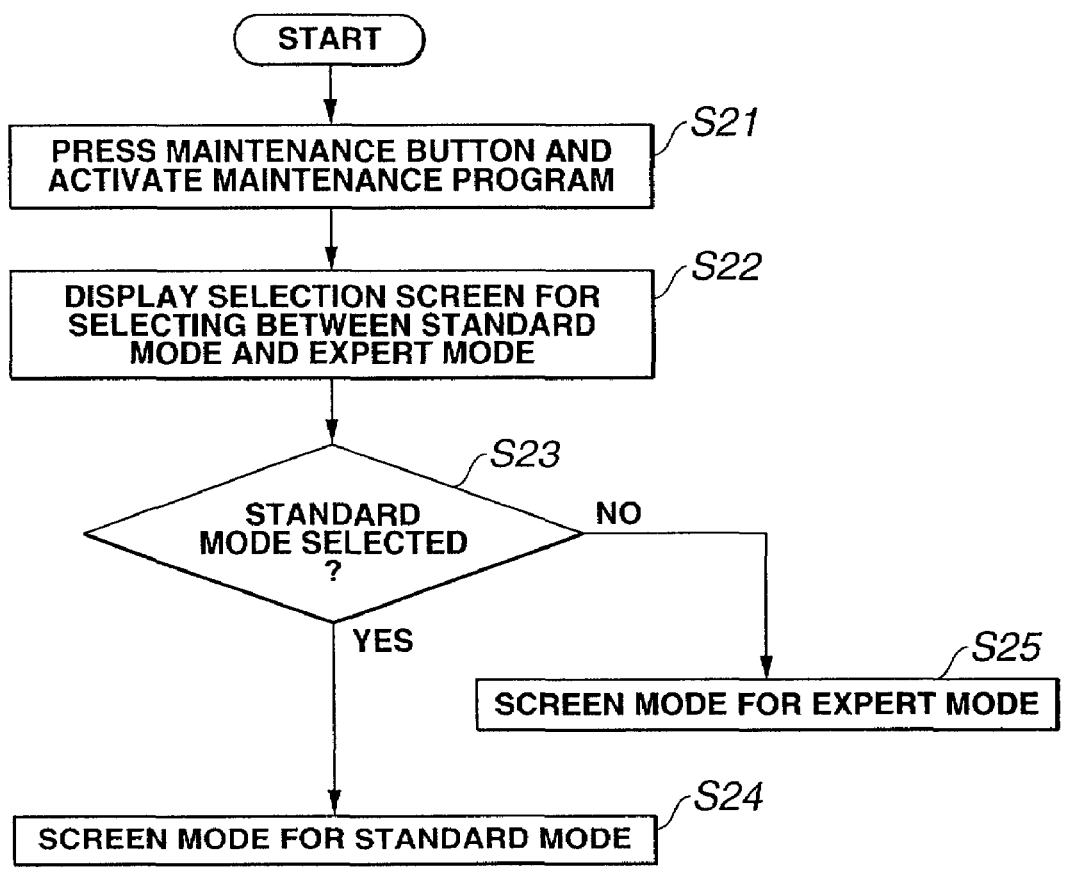

In this case, with the flowchart shown in FIG. 14, upon activating the maintenance program in step S21 as with that shown in FIG. 10, the number of times of using that program (N) is read out from the recording medium 16 or the like, and the value thereof is incremented by 1 and updated. That is to say, each time this program is used, the number of times of use is updated (counted) (step S26).

Next, the CPU 15 judges whether or not the number of times of use (N+1) has exceeded a predetermined number of times, 50 for example, and in the event that this holds true, the screen mode is set to the expert mode (step S25). On the other hand, in the event that the number of times of use (N+1) has not exceeded the predetermined number of times, the screen mode is set to the standard mode (step S24).

According to the present modification, even in the event that the screen mode for the display contents is not normally selected, maintenance can be performed by automatically setting the screen mode according to the level of experience of the user with regard to maintenance.

Now, in the above description, a case has been described wherein, in the event of displaying information of operations or the like for recovering from a trouble item, an operating screen for recovering by operation from the control panel 13 for centralized operations, and another advice screen are simultaneously displayed either separately or in a mixed manner, but an arrangement may be made wherein an operating screen whereby trouble can be recovered from by operating operation buttons or the like for all devices making up the system 1, and an advice screen for performing other operations or the like, are displayed either separately or simultaneously.

(Second Embodiment)

Next, a second embodiment of the present invention will be described with reference to FIGS. 15 through 19.

Figure 15:
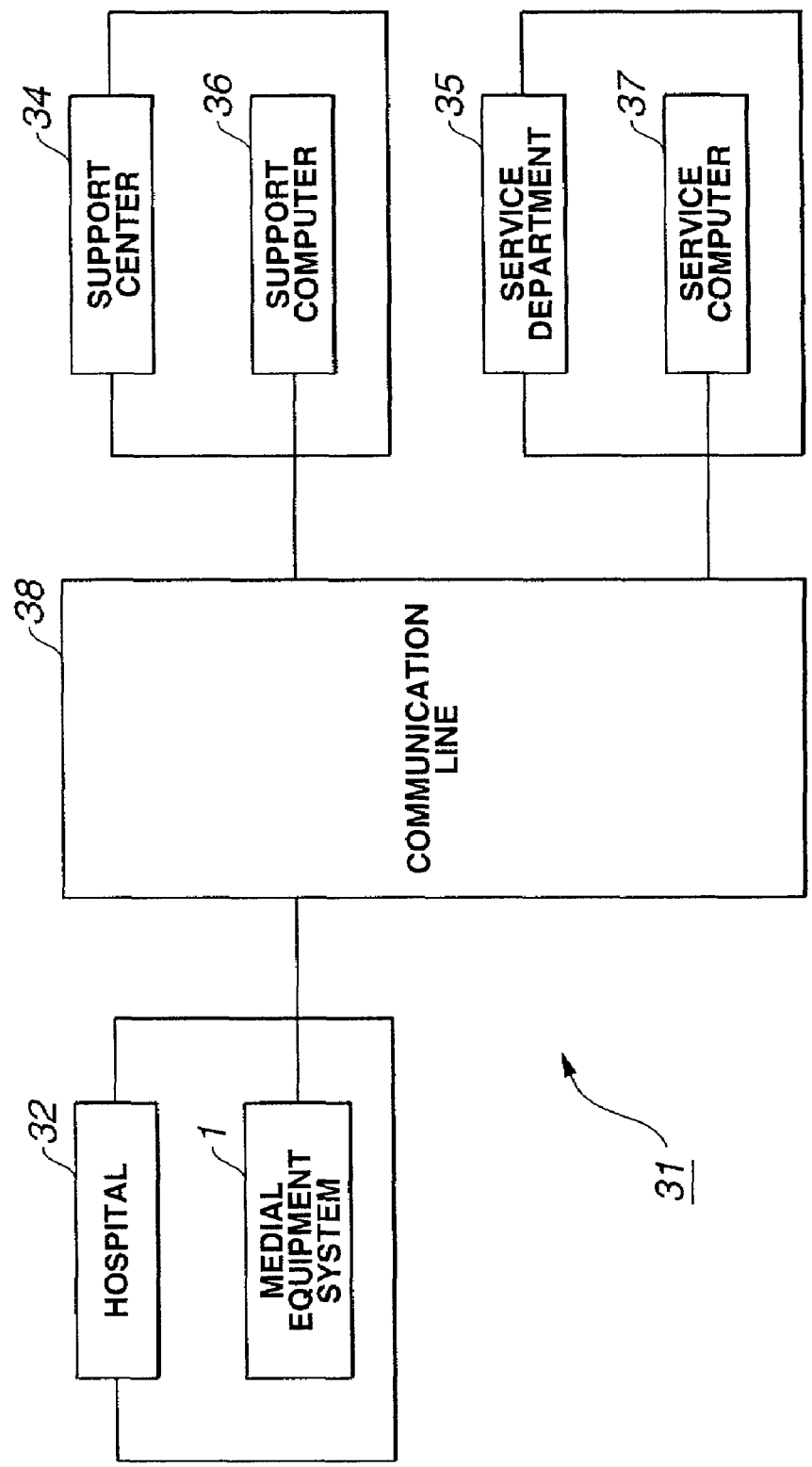

As shown in FIG. 15, the medical device control system 31 according to the present embodiment comprises a medical device system 1 such as that shown in FIG. 1A for example, in a hospital 32, a support center (support department) 34 which provides large-scale support such as maintenance of the medical device system 1 and so forth, and a service department 35 which provides small-scale maintenance and the like of the medical device system 1. The medical device system 1 is communicably connected with the support computer 36 of the support center 34, and the service computer 37 of the service department 35 via a communication line 38. Note that the support center 34 and the service department 35 may be situated at a remote location from the hospital 32.

Also, with the medical device system 1 shown in FIG. 15, a status transmission button 21c such as shown on the main screen G0 in FIG. 2, the menu window screen G1 shown in FIG. 3, and so forth, are displayed, and in the event that the user cannot resolve a trouble item by maintenance processing and the status transmission button 21c is pressed, the CPU 15 is constituted to transmit information necessary for receiving detailed information or support relating to the trouble item to the support computer 36 of the support center 34, and more general information (by filtering detailed information) to the service computer 37 of the service department 35, via the communication interface 18 (see FIG. 1A) and communication line 38.

That is to say, the recording medium (denoted by reference numeral 16 in FIG. 1A) recording the program for performing maintenance processing further stores a program having functions for transmitting information to the support center 34 and the like.

At the support center 34, staff experienced in maintenance processing estimate the cause of the trouble item and countermeasures in more detail, based on the information transmitted thereto. Also, with the present embodiment, the system controller 8 (or more specifically, the CPU 15 thereof) monitors, over time, the state (status) of the devices of the medical device system 1 upon the power thereof having been turned on, and records the monitored state of the devices in the recording medium 16 or the like. Also, the history and the like of selecting and specifying trouble items, and processing by recovery operations following specification thereof, is also recorded in the recording medium 16 or the like, in maintenance mode.

Then, upon the status transmission button 21c being operated, the CPU 15 transmits the information of the system 1 recorded in the recording medium 16 or the like to the support computer 36 of the support center 34, and also transmits a part of the information to the service computer 37 of the service department 35, such as what sort of trouble item has occurred, or the like.

Other configurations as the same as with the first embodiment.

Next, a representative operation of the present embodiment will be described with reference to the flowchart shown in FIG. 16.

Figure 16:
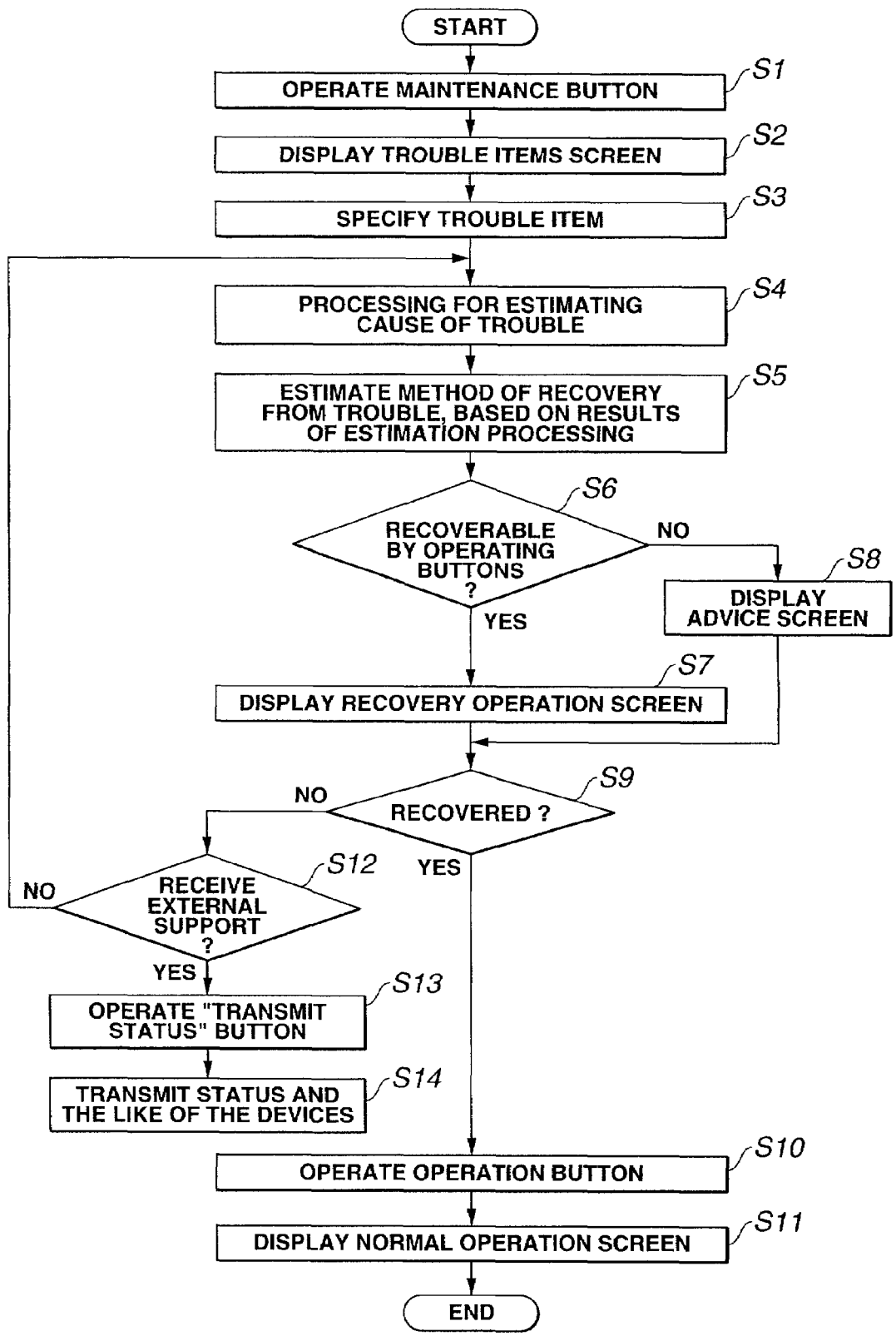

The present embodiment is the same as the first embodiment through step S9 in FIG. 16. Note, however, that in this case, information of operations made in the maintenance mode, and change in the status of the devices, are recorded in the recording medium 16 or the like, by the CPU 15.

In the event that the trouble item has been recovered from by execution of step S9, the flow proceeds to step S10, while in the event that the trouble item has not been recovered from, a display is made to select whether or not to accept external support (step S12). In the event that the user selects not to accept external support, the flow returns to step S4, and the same processing as that of the first embodiment is repeated.

On the other hand, in the event that the user selects to accept external support, a display is made prompting the user to operate the status transmission button 21c, so that the user presses the status transmission button 21c (step S13).

As a result, in the subsequent step S14, the CPU 15 transmits the status information of the devices in the current system configuration and the history information and the like recorded in the recording medium 16 and the like during the maintenance mode to the support computer 36 of the support center 34, and also sends a part of the information that is necessary for service relating to the trouble items, to the service computer 37 of the service department 35, as well.

Figure 17:
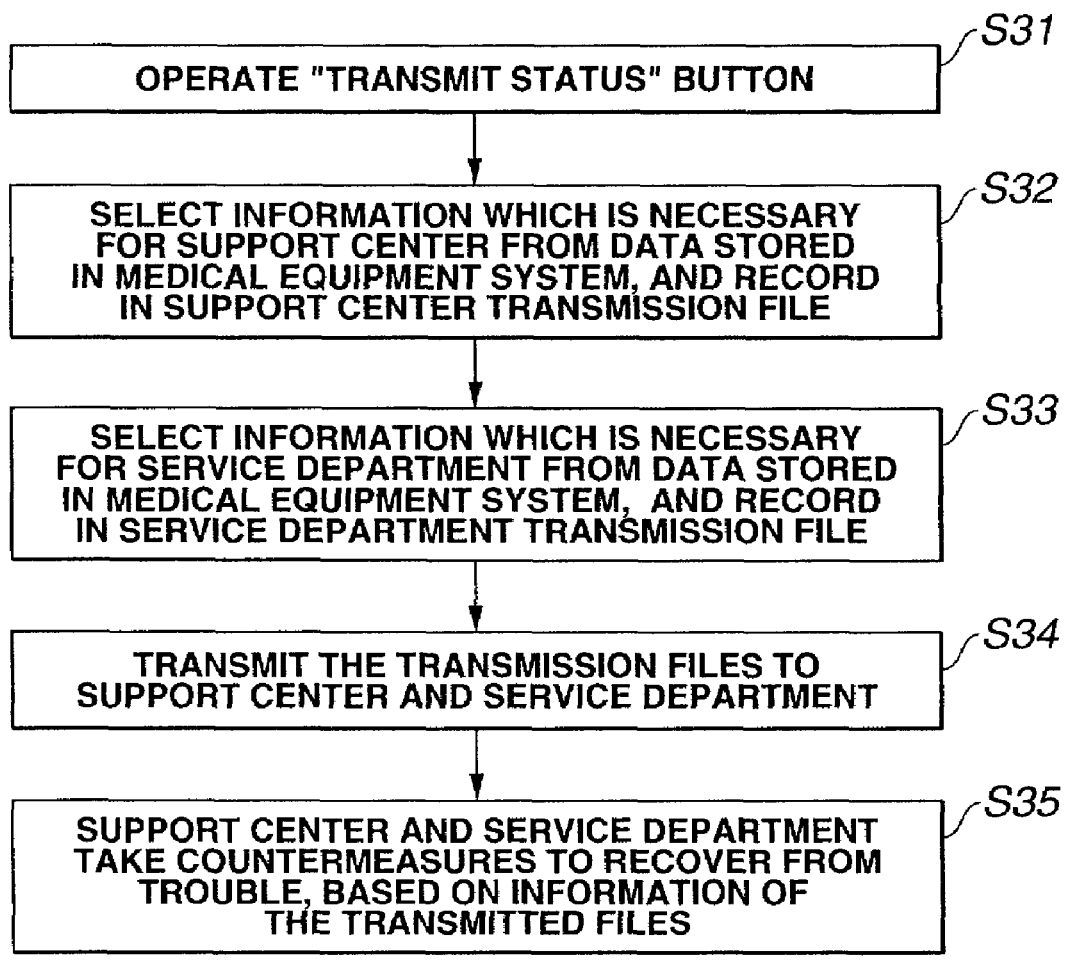

FIG. 17 is a flowchart illustrating the actions for transmitting information from the medical device system 1 to the support computer 36 of the support center 34 and the service computer 37 of the service department 35.

As indicated by step S31, upon the status transmission button 21c being operated, the CPU 15 selects the information necessary for the support center 34 from the data stored in the medical device system 1, as indicated by step S32, and the information is recorded in the support center transmission file.

Also, as indicated in step S33, the CPU 15 selects the information necessary for the service department 35 from the data stored in the medical device system 1, and records the information therein an the service department transmission file.

Then, as indicated in step S34, the CPU 15 transmits the data of the transmission files to the support center 34 and the service department 35, via a communication line 37.

Subsequently, as indicated in step S35, reference is made to the transmitted transmission files at the support center 34 and the service department 35, where processing is performed in a joint manner to study countermeasures to recover from the trouble item.

For example, in the event that the countermeasures are simple procedures which the user side can easily handle, the user is notified of the countermeasures, and performs recovery from the trouble item. Also, in the event that a device is malfunctioning or so forth, service personnel are dispatched from the service department side 35 to the hospital 32, to perform recovery from the trouble item.

According to the present embodiment, in addition to the advantages of the first embodiment, in the event that the user cannot handle trouble, the user can receive support from external specialized staff, and accordingly can speedily recover from trouble items.

Also, according to the present embodiment, in the event that multiple support departments with different functions, sizes, etc., exist, information needed by each department is transmitted to each of the multiple support departments almost simultaneously, in the event of requesting support for recovery from the trouble item. These departments can speedily deal with the trouble item by functioning in joint fashion or the like.

Figure 18:
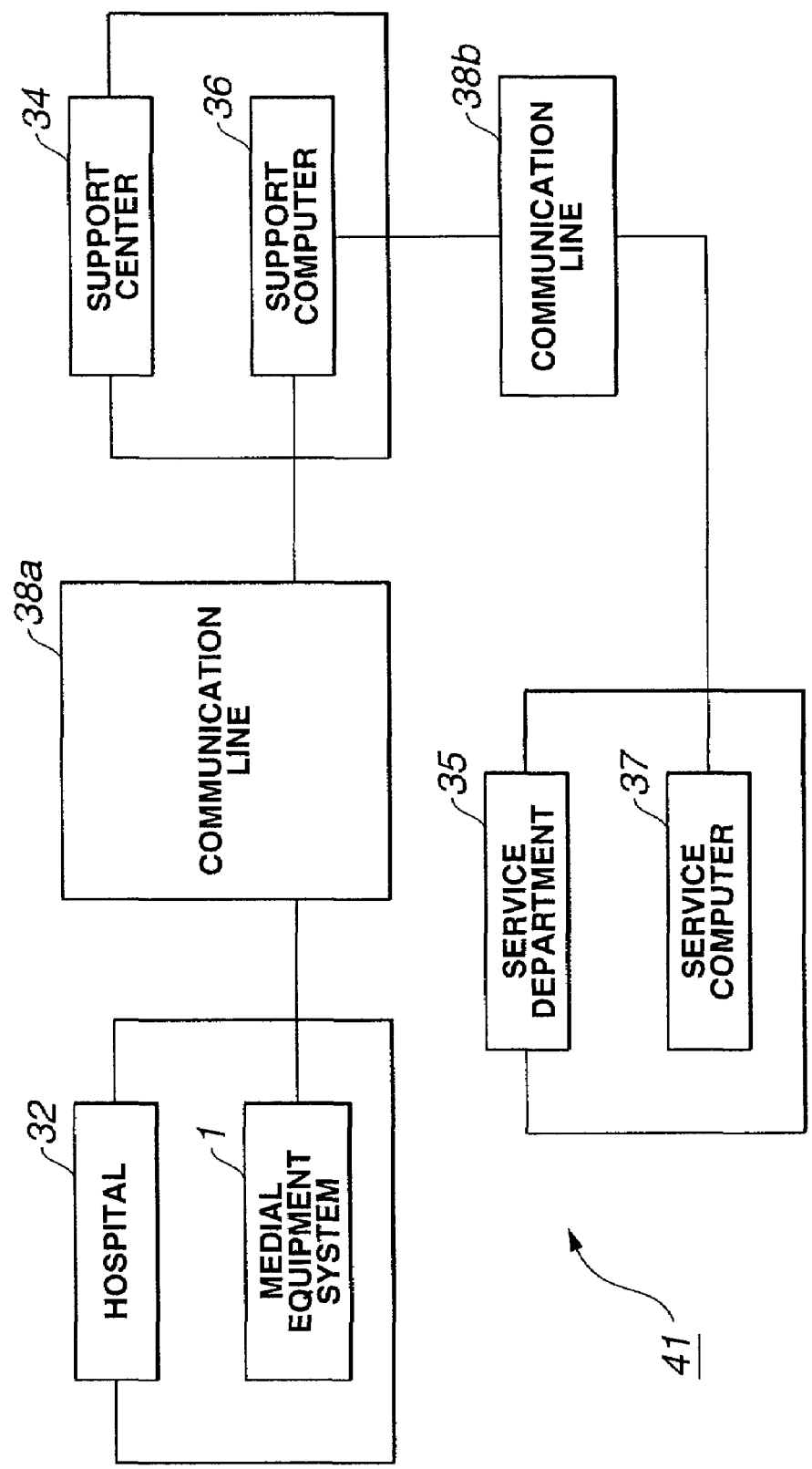

FIG. 18 illustrates a modification. The medical device control system 41 shown in FIG. 18 is an arrangement wherein, with reference to the medical device control system 31 shown in FIG. 15, the medical device system 1 of the hospital 32 is connected to the support computer 36 of the support center 34 by a communication line 38a, and the support computer 36 of the support center 34 is connected to the service computer 37 of the service department 35 by a communication line 38b.

In FIG. 18, communication can be made between at least the hospital 32 and the support center 34, and also communication can be made between the support center 34 and the service department 35, so other configurations having the same functions will suffice, or the configuration shown in FIG. 15 will suffice, as well.

With the present modification, upon the status transmission button 21c being pressed as described below, detailed information necessary for recovery from the trouble item is transmitted from the medical device system 1 of the hospital 32 to the support computer 36 of the support center 34. The support computer 36 of the support center 34 then automatically sorts out the information sent thereto and creates information needed by the service department 35, and transmits that information to the service computer 37 of the service department 35.

Figure 19:
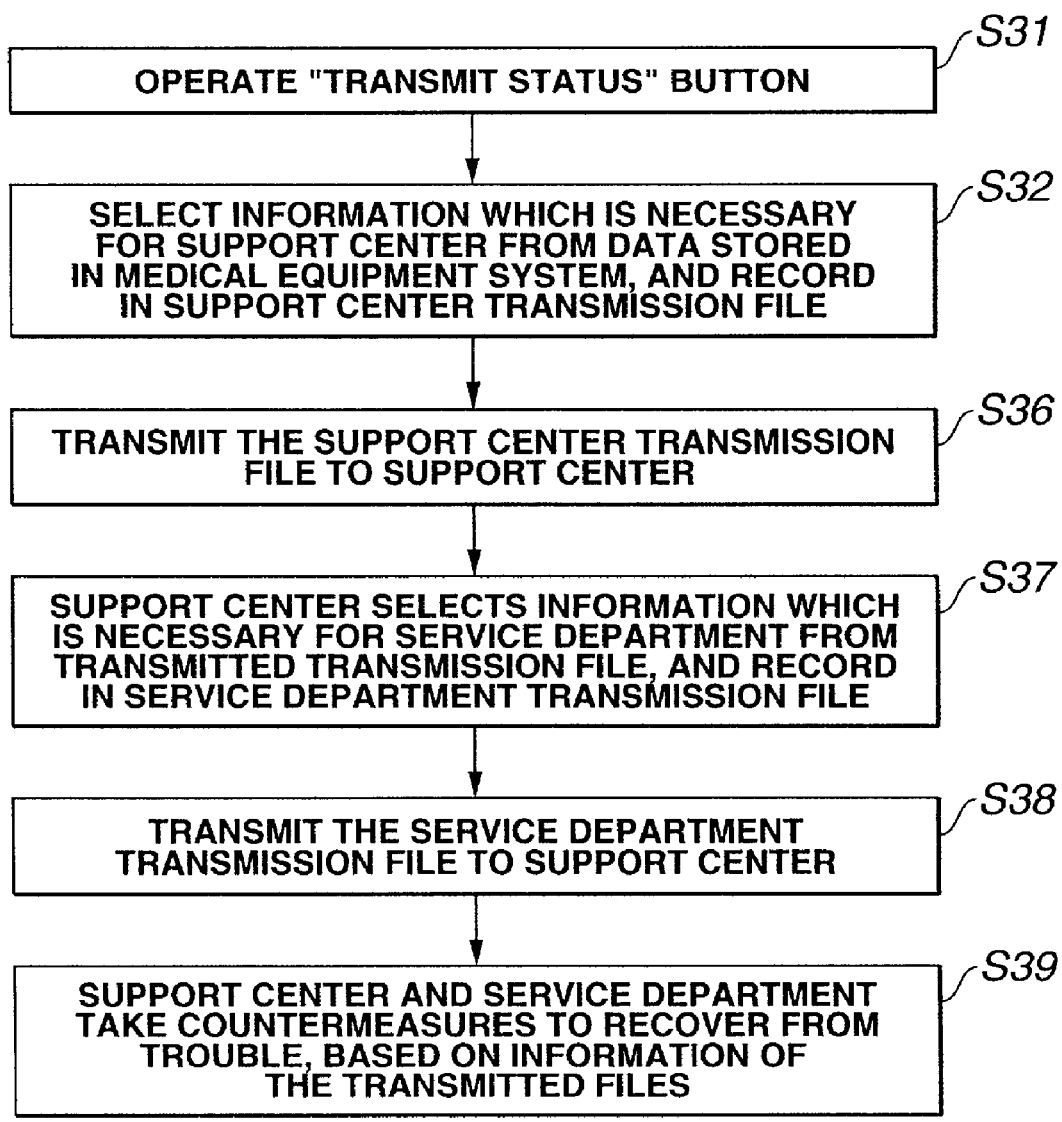

Next, the operation of the present embodiment will be described with reference to the flowchart shown in FIG. 19. Steps S31 and S32 are the same as with FIG. 16. Following step S32, in step S36 a support center transmission file is transmitted from the hospital 32 (or more specifically, the medical device system 1 thereof) to the support center 34 (or more specifically, the support computer 36 thereof).

In response, the support center 34 (or more specifically, the support computer 36 thereof) sorts out the information needed by the service department 35 from the support center transmission file transmitted as indicated in step S37, and records the selected information in a service department transmission file.

Then, in step S38, the support center 34 (or more specifically, the support computer 36 thereof) transmits the service department transmission file to the service department 35 (or more specifically, the service computer 37 thereof).

Subsequently, as indicated in step S39, the support center 34 and the service department 35 make reference to the transmitted transmission files to study, in a joint fashion, countermeasures to recover from the trouble item.

The present modification has approximately the same advantages as the second embodiment.

(Third Embodiment)

A third embodiment of the present invention will be described with reference to FIG. 20A through FIG. 25. Note that the components which are the same as those in the first and second embodiments are denoted with the same reference numerals, and detailed description thereof is omitted.

The present embodiment is an arrangement having functions for the system 1 according to the first embodiment to store error information relating to errors that have occurred, and display the error information as history information.

Figure 20A:
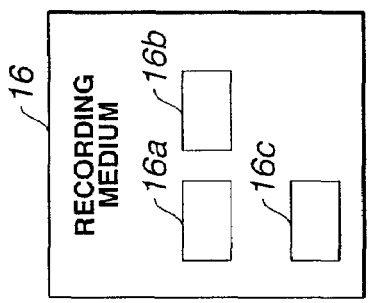

As shown in FIG. 1A, the CPU 15 of the system controller 8 performs communication via connection lines connected to each of the devices connected to the system controller 8, and performs centralized control thereof. In the event that an error occurs in the devices and the system controller detects the error via the connection lines, the CPU 15 displays an error message thereof on the control panel 13, and also records the contents of the error message, the time of occurrence, and other like information, in the recording medium 16. That is to say, as shown in FIG. 20A, the recording medium 16 further comprises an error information storing unit 16c for storing error information.

Figure 20B:
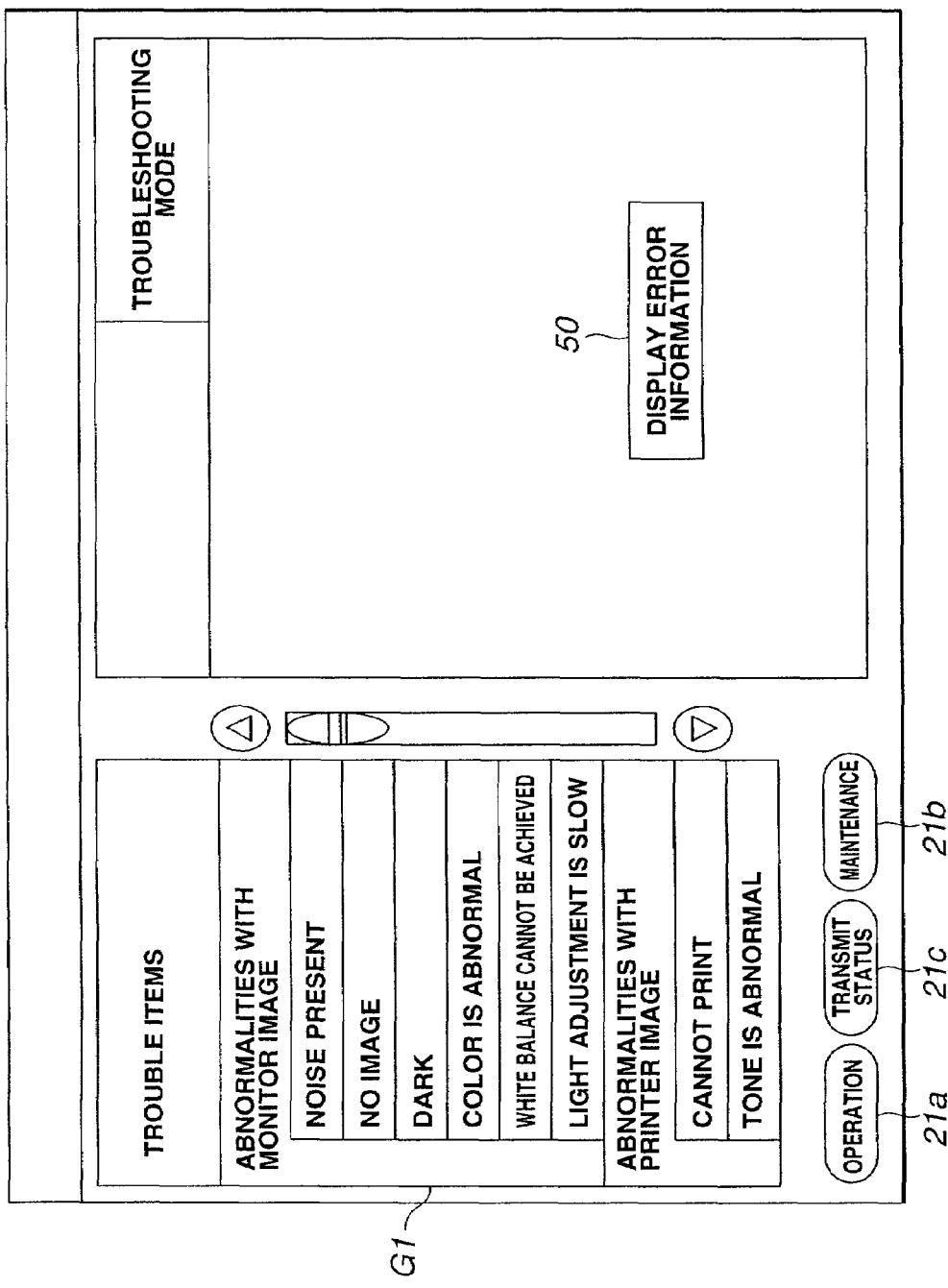
FIG. 20B is a diagram illustrating a menu window screen and trouble recovery operation screen according to the third embodiment.

FIG. 20B illustrates the menu window screen and trouble recovery operation screen top screen. This screen is displayed by pressing the maintenance button 21b on the normal operation screen shown in FIG. 2. The top screen comprises a menu window screen G1 for displaying the trouble recovery operating screen, and an error information window display button 50 for displaying error information recorded in the recording medium 16.

Figure 21:
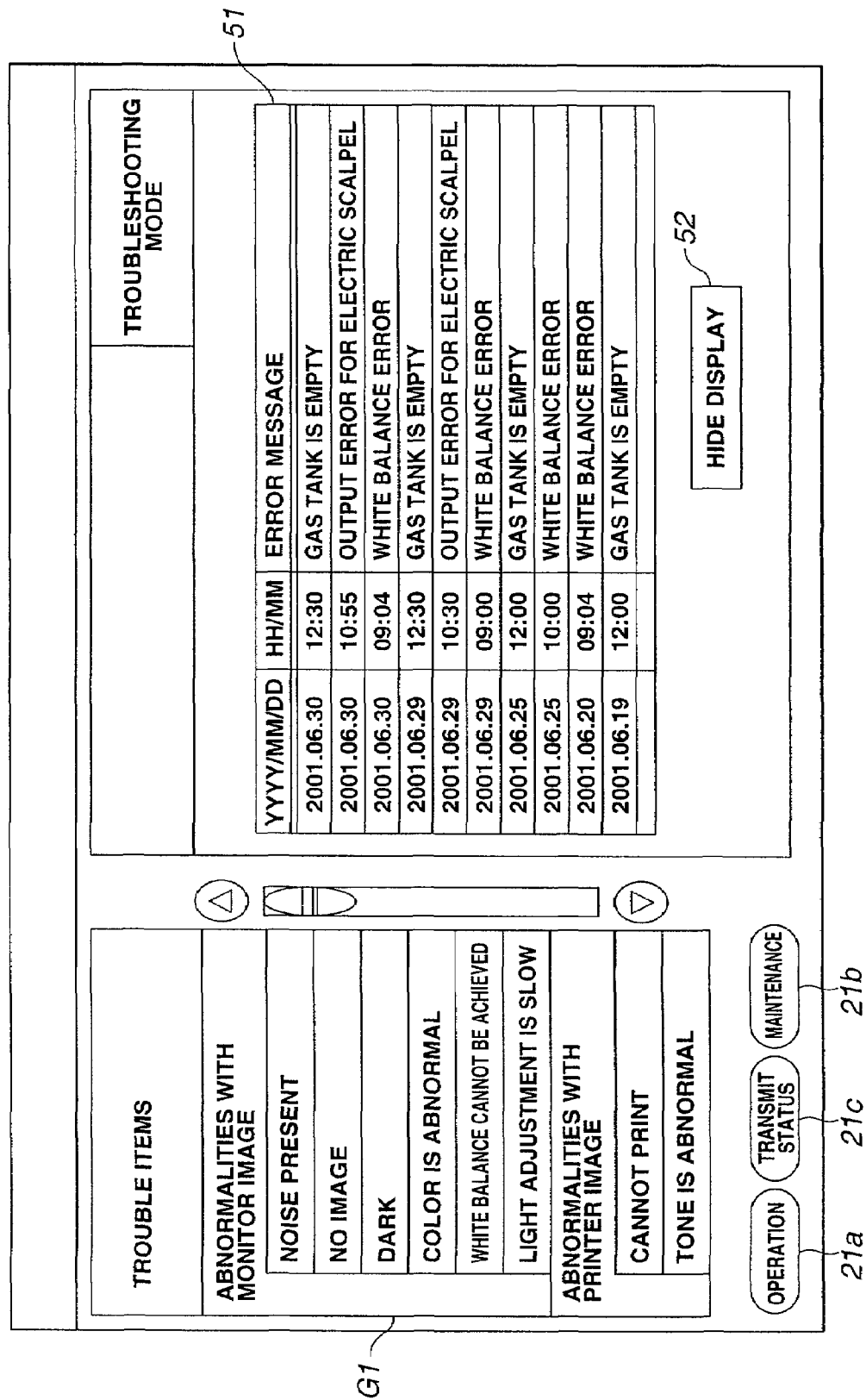

FIG. 21 illustrates a screen whereupon an error information window 51 is displayed on the top screen of the menu window screen and trouble recovery operation screen. The error information window 51 is displayed by pressing the error information window display button 50. The error information window 51 goes away upon pressing a remove button 52, and the top screen of the menu window screen and trouble recovery operation screen shown in FIG. 20B are displayed.

As shown in FIG. 21, with the present embodiment, the ten most recent error messages of the error information of the devices recorded in the recording medium 16 are displayed in the error information display window 51, as history information. The arrangement may be such that the error display window has a hierarchical structure wherein all error messages that have occurred are displayed, or wherein error messages that have occurred on that particular day are displayed.

Next, the operation of the present embodiment will be described.

The operations for performing troubleshooting according to the present embodiment will be described with reference to FIGS. 2, 20B, and 21, as an example relating to monitor image abnormalities.

The user operates the devices using the normal operation screen G0 shown in FIG. 2. While operating, the error messages occurring at the devices are displayed on the control panel 13, and are recorded in the recording medium 16. In the event of the user performing troubleshooting, the user presses the maintenance button 21b. This brings up the top screen of the menu window screen and trouble recovery operation screen shown in FIG. 20B.

Next, upon pressing the error information window display button 50 on the top screen of the menu window screen and trouble recovery operation screen, the error information display window 51 shown in FIG. 21 is displayed. The user confirms what sort of errors are occurring in the devices while operating, from the displayed contents of the error information display window 51.

For example, in the state shown in FIG. 21, it can be understood that white balance errors are occurring frequently. Now, pressing the remove button 52 puts away the error information window 51 displayed, and the screen returns to the top screen shown in FIG. 20B.

Since it can be drawn from the confirmation results of the error information window 51 that an item relating to white balance is the cause of the abnormalities with the monitor image, the user selects "WHITE BALANCE CANNOT BE ACHIEVED" from the menu window G1, and subsequently performs the trouble recovery operations according to the same procedures as with those described according to the first embodiment.

Figure 22:
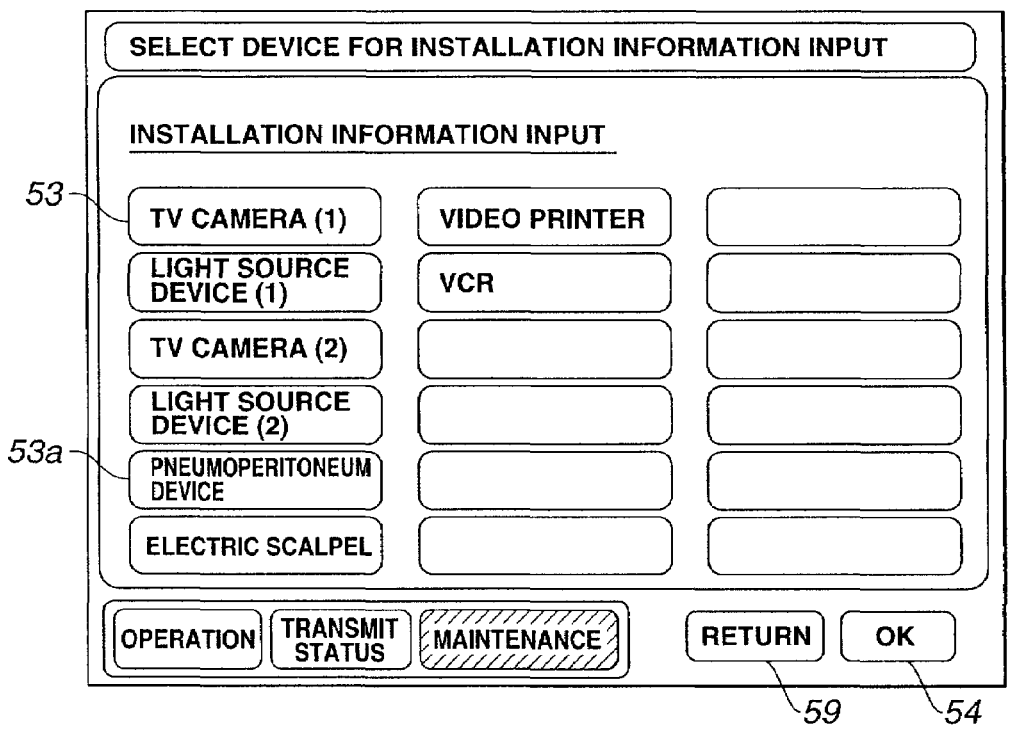

Also, with the present embodiment, the following installation information input operation can be performed. FIG. 22 is a diagram illustrating an installation information input screen.

With the present embodiment, an installation information input screen such as shown in FIG. 22 is displayed by pressing the maintenance button 21b in the normal operation screen G0 shown in FIG. 2 for an extended time (e.g., 3 seconds).

Arrayed in this installation information input screen are equipment selection buttons 53 for selecting the equipment for inputting installation information, an OK button 54 for recording input information regarding completion of input of installation information in the recording medium 16, and a switch 59 for returning to the screen displayed before displaying the installation information input screen. The installation information of the equipment recorded in the recording medium 16 serves as part of the data in the transmission files which are transmitted to the support center 34 and service department 35.

Figure 23:
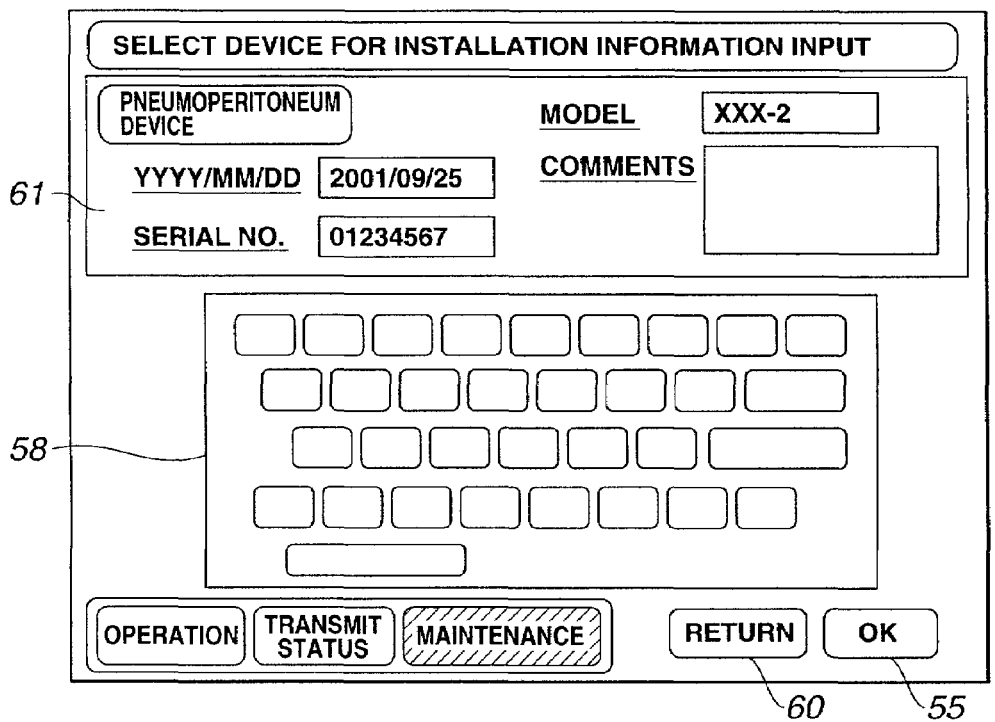

FIG. 23 illustrates a pneumoperitoneum device installation information input screen as an example. This screen is displayed by pressing the pneumoperitoneum device selection screen 53a of the installation information input screen shown in FIG. 22. The pneumoperitoneum device installation information input screen is made up of an installation information input window 61, a keyboard screen 58, an OK button 55 for completing input and displaying the installation information input screen, and a return button 60 for returning to the installation information input screen without completing input.

Input items for installation information consist of date of installation (YYYY, MM, DD), model, serial No., and comments, which can be input from a keyboard screen 58 provided on the screen. Pressing the OK button 55 upon completion of input returns to the installation information input screen shown in FIG. 22.

Thus, the support center 34 and service department 35 can use this installation information for studying measures for recovering from the trouble item, and accordingly, speedier and more effective countermeasures can be reached.

Also, a modification of the menu window screen and trouble recovery operation screen of the present embodiment will be described next.

Figure 24:
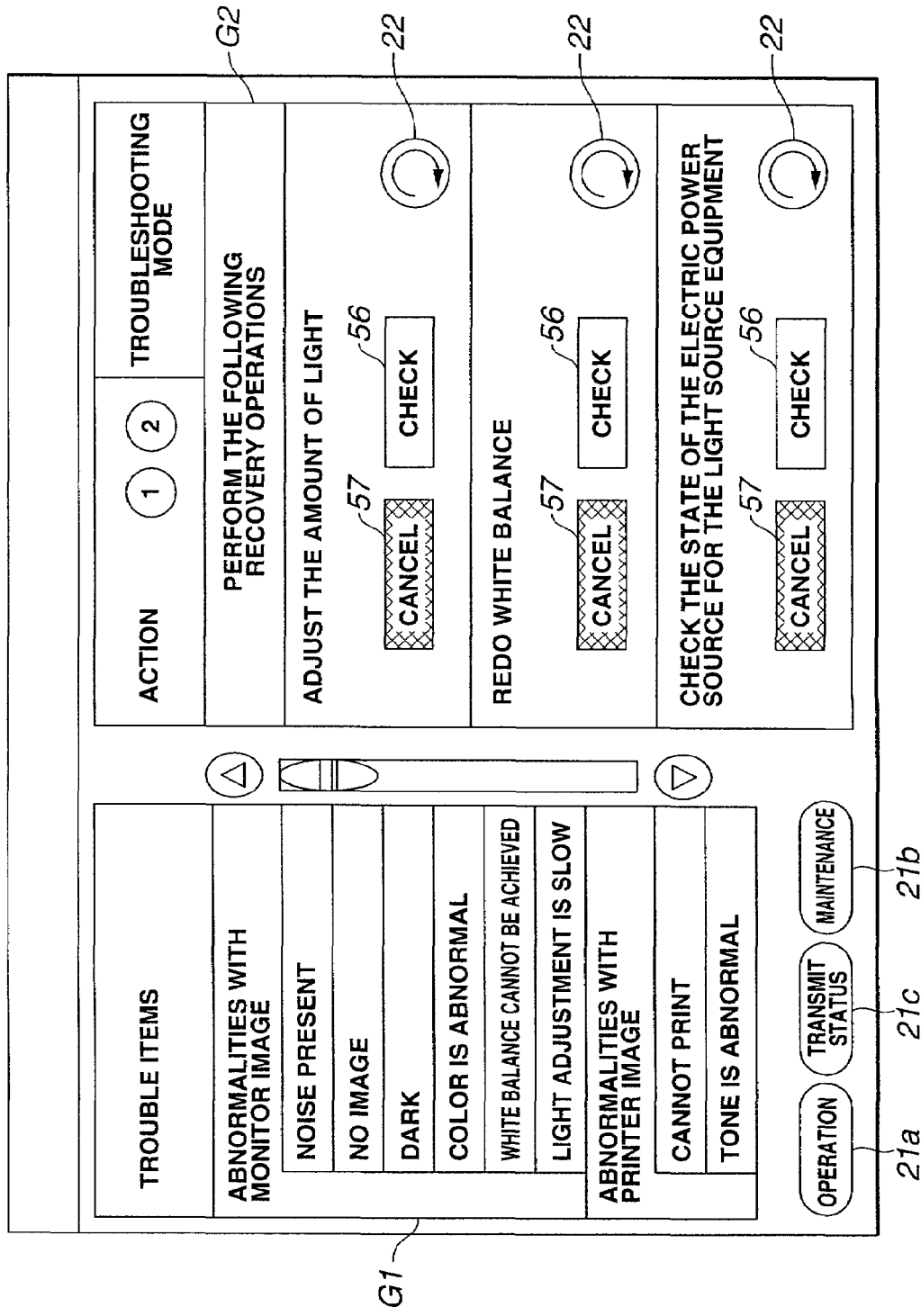
Figure 25:
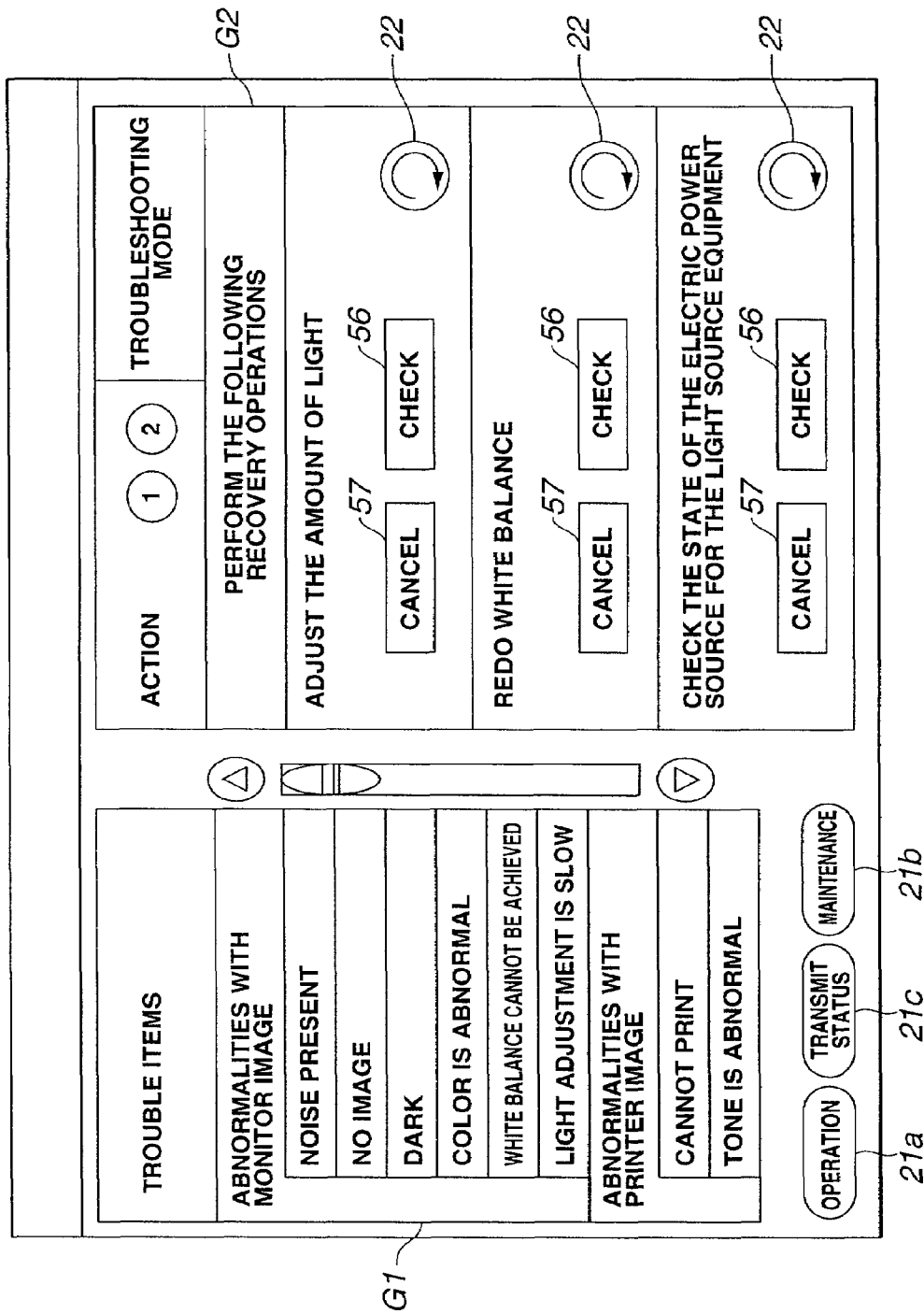

FIGS. 24 and 25 illustrate an example of the menu window screen and trouble recovery operation screen modification. Disposed on the trouble recovery window screen G2 are a check button 56 and a cancel button 57. Before performing trouble recovery operations, the cancel button 57 is hatched as shown in FIG. 24, and input operations thereby are disabled.

Following performing trouble recovery operations, pressing the check button 56 changes the display of the check button 56 to "checked" and input thereby is disabled, and the hatched cancel button 57 is displayed clearly and input thereby is enabled, as shown in FIG. 25.

In the event that the user wants to cancel the contents that have already been checked, pressing the cancel button 57 returns the screen to the state shown in FIG. 24. Thus, in the event that there are multiple causes for the trouble, the user can tell at a glance which trouble recovery operations have been performed and which have not, which is very handy for the user.

The present embodiment has the following advantages.

In addition to the advantages of the first embodiment, any errors which have occurred during surgery can be known at a glance, so causes of trouble items can be more readily thought of, which leads to speedy trouble recovery operations, thereby improving ease of use.

(Fourth Embodiment)

Next, a fourth embodiment of the present invention will be described with reference to FIGS. 26 and 27. Note that the components which are the same as those in the first through third embodiments are denoted with the same reference numerals, and detailed description thereof is omitted.

The present embodiment is a the same hardware configuration as that of the third or first embodiments, that is to say, the same as the system 1 shown in FIG. 1A.

The recording medium 16 comprises an error information storing unit 16c for storing error information, as with the third embodiment. As described below, the present arrangement involves taking into consideration the frequency of occurrence of trouble or the like, and listing those with a higher frequency of occurrence with higher priority.

As shown in FIG. 1A, the CPU 15 of the system controller 8 performs communication via connection lines connected to each of the devices connected to the system controller 8, and performs centralized control thereof.

In the event that an error occurs in the devices and the system controller detects the error via the connection lines, the system controller 8 displays an error message thereof on the control panel 13, and also records the contents of the error message, the time of occurrence, and other like information, in the recording medium 16. The CPU 15 tabulates the recorded error information and displays trouble items related to error messages with a high frequency of occurrence in the menu window screen G1, in descending order of frequency of occurrence.

Figure 26:
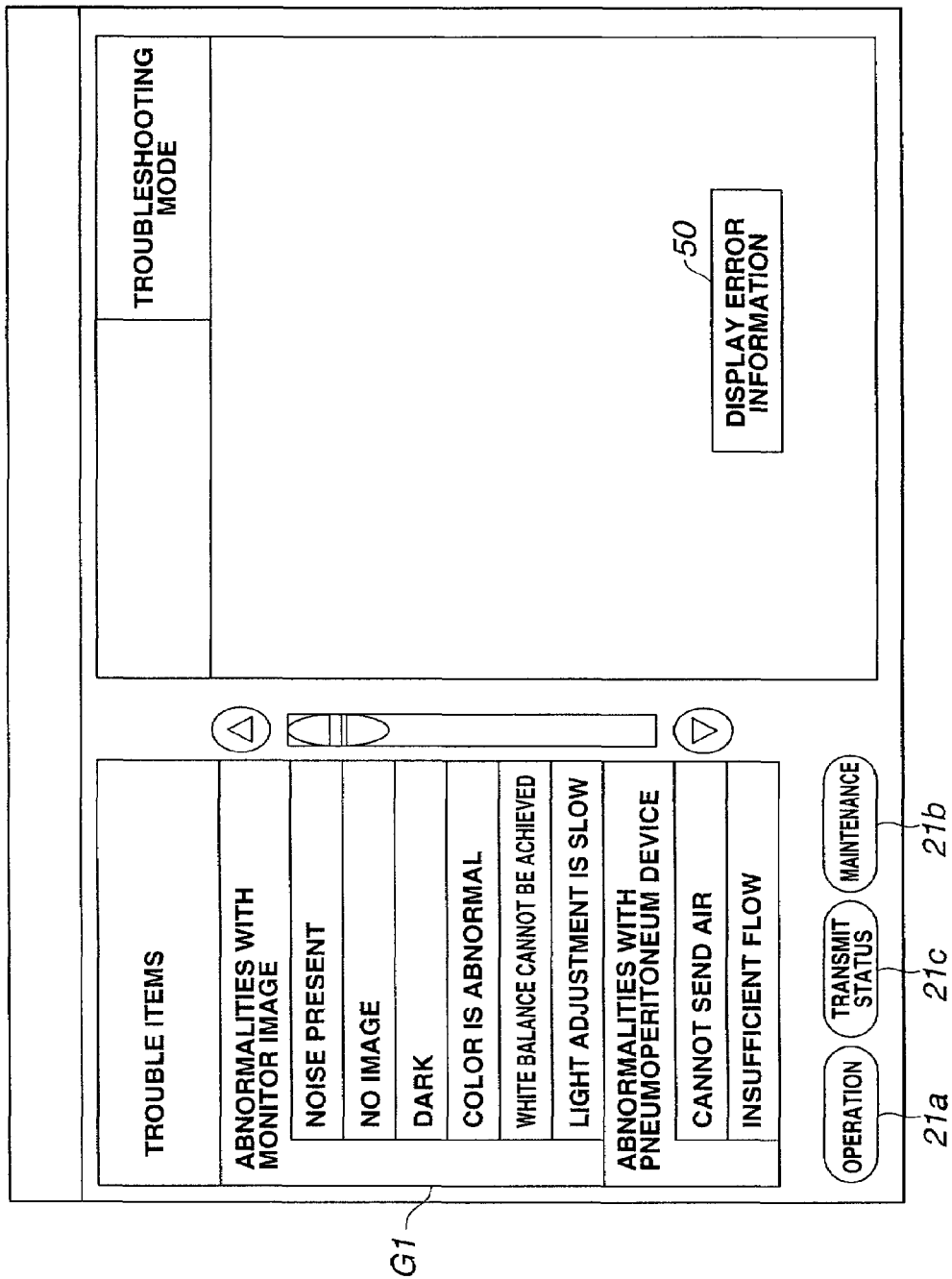

FIG. 26 illustrates the top screen of the menu window screen and trouble recovery operation screen according to the present embodiment. FIG. 27 illustrates a screen displaying the error information display window according to the present embodiment.

Next, the operation of the present embodiment will be described.

Operations for performing troubleshooting with the present embodiment will be described with reference to FIGS. 2, 26, and 27.

The devices are operated using the normal operating screen G0 shown in FIG. 2. While operating, error messages occurring at the devices are displayed on the control panel 13, and are recorded in the recording medium 16. The CPU 15 determines the priority in order of display for trouble items to be displayed on the menu window, based on the error information recorded in the recording medium 16.

In the event of the user performing troubleshooting, the user presses the maintenance button 21b. This brings up the top screen for the menu window screen and trouble recovery operation screen, shown in FIG. 26. At this time, the order of display of trouble items displayed in the menu window screen G1 is a display made in descending order of frequency of occurrence of trouble related to the error.

Figure 27:
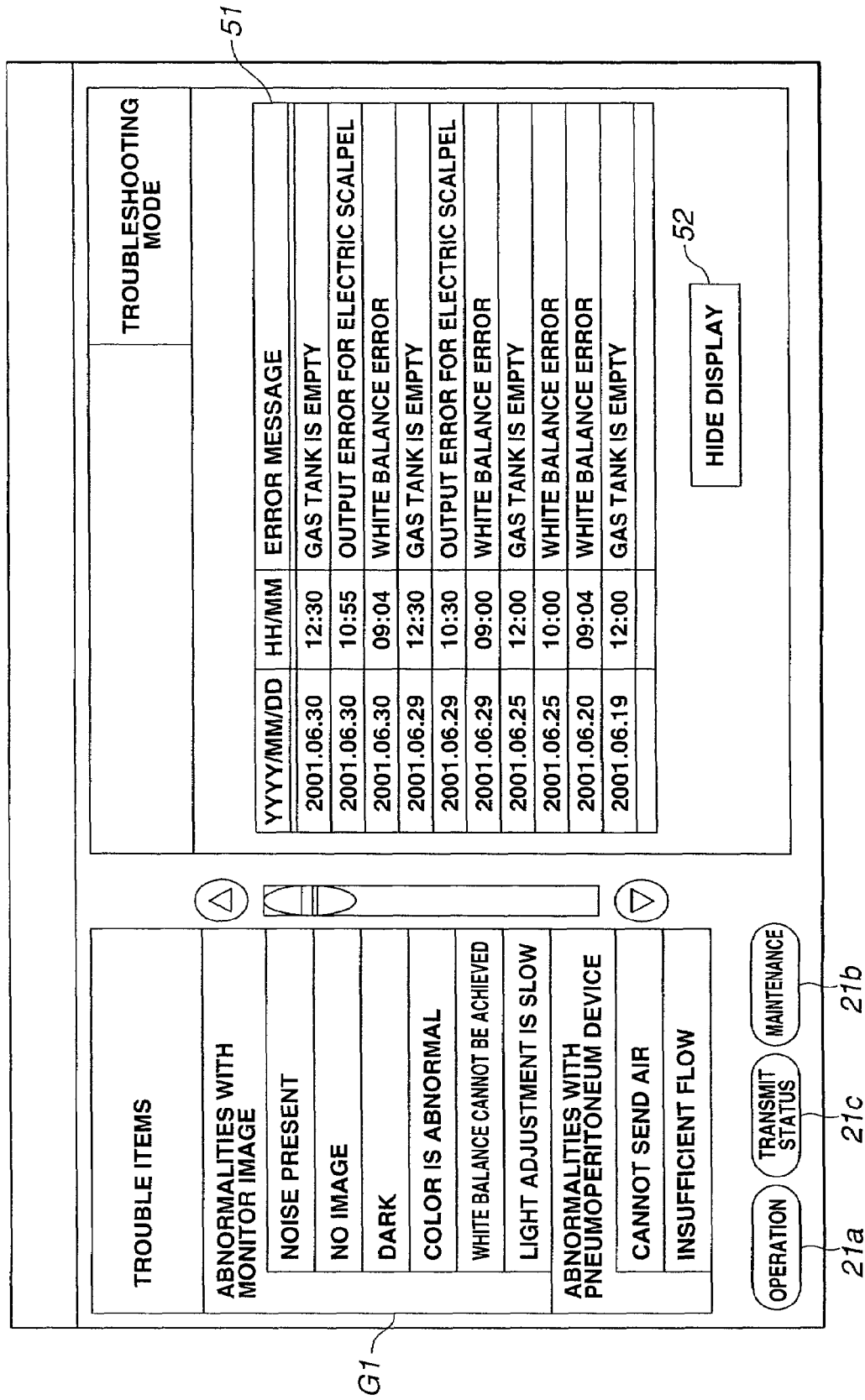

With the present embodiment, the error information shown in FIG. 27 is reflected, and "Monitor image abnormality" which is a trouble item related to the white balance error which has the highest frequency of occurrence is displayed at the top of the menu. Next in the menu is "Abnormalities with pneumoperitoneum device" which is a trouble item related to the gas tank being empty, the next most frequent. Thus, the trouble items are displayed in the menu window in the order of frequency of occurrence.

The present embodiment has the following advantages.

In addition to the advantages of the third embodiment, items with higher frequency of occurrence are displayed at the top of the list as causes of trouble, so trouble can be dealt with more speedily.

(Fifth Embodiment)

Next, a fifth embodiment of the present invention will be described with reference to FIGS. 28 through 30. The present embodiment is arranged such that in the event that trouble occurs with the first embodiment for example, the trouble can be resolved efficiently. Accordingly, description will be made with reference to FIGS. 2 through 8, as well.

Figure 28:
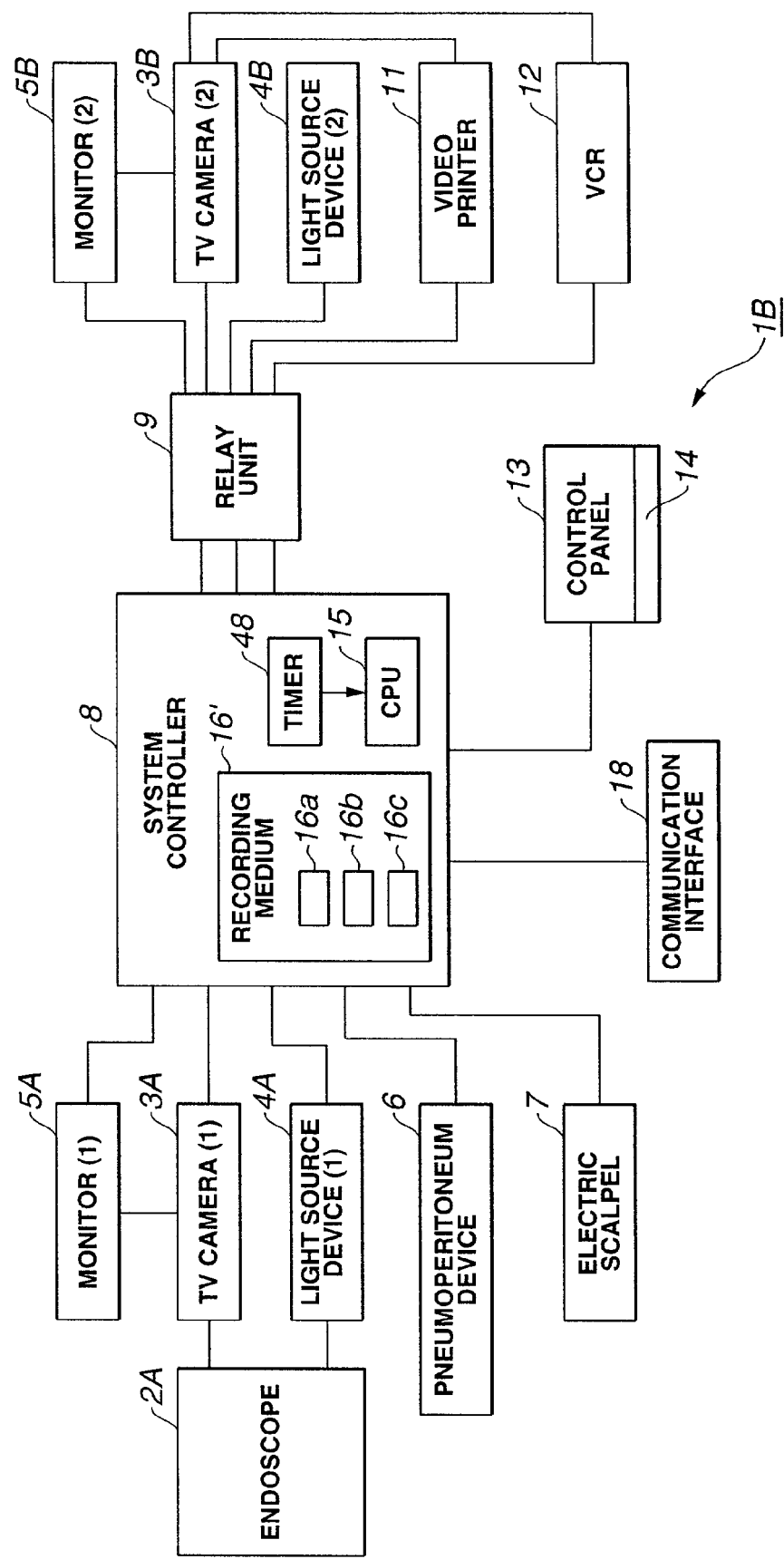
FIG. 28 is a block diagram illustrating the overall configuration of a medical device system comprising the fifth embodiment of the present invention.

FIG. 28 illustrates a medical device system 1B according to the fifth embodiment. This medical device system 1B involves the medical device system 1 shown in FIG. 1A comprising a recording medium 16' within the system controller 8, instead of a recording medium 16 outside of the system controller 8.

This recording medium 16' stores, in addition to the control program 16a and processing program 16b for dealing with trouble, stored in the recording medium 16 described in the above first embodiment, occurrence probability-related information 16d which is information relating to the occurrence probability of trouble. Also, a timer 48 is connected to the CPU 15, so as to measure the accumulated use of usage of the system controller 8 when the power source is turned on, which can be recorded in the recording medium 16'. Other configurations are the same as that of the first embodiment, so description thereof will be omitted.

The CPU 15 of the system controller 8 performs communication via connection lines connected to each of the devices connected to the system controller 8, and performs centralized control thereof.

In the event that an error occurs in the devices and the system controller 8 detects the error via the connection lines, the system controller 8 displays an error message thereof on the display screen of the control panel 13.

Also, with the present embodiment, the CPU 15 recognizes the connected devices, and the normal operating screen (main screen) G0 shown in FIG. 2 is displayed on the display face of the control panel 13.

Also, displayed at the bottom left side of the main screen G0 for example are an operation button 21a for returning to the normal screen, and a maintenance mode switch-over button (hereafter simply referred to as "maintenance button") 21b for specifying selection of maintenance screen or trouble items. Also, in FIG. 2 and other drawings, a status transmission button for transmitting the system status 21c is shown. This status transmission button 21c does not function in the event that the system 1B is not connected to external devices via a communication interface 18.

In the event of performing maintenance, pressing the maintenance button 21b brings up a menu window screen G1 displaying trouble items, such as shown in FIG. 3.

Specifying an item in the main window screen G1, either by touching the position of a trouble item or by another means, displays a countermeasures screen for solving or recovering from the trouble item, i.e., a trouble recovery window screen G2, at the right side.

In the event that a trouble item is specified by selection, as described later, the CPU 15 performs processing for estimating the cause of the occurrence of that trouble item, performs processing for estimating the recovery operation or operation method or the like for recovering from that trouble item based on the estimation results, and displays the information of the processing results on the control panel 13. That is to say, the CPU 15 performs processing for estimating the recovery operation or operation method or the like for recovering from the trouble item.

In the case shown in FIG. 3, the troubleshooting in response to the item specified, which is the item stating that the color of the monitor screen is abnormal, for example, consists of countermeasures such as to re-adjust the white balance, and jump switches 22 provided at the display portions thereof.

The user operates the jump switches 22 provided at the display portions thereof in order to perform the proper operations following the display of the trouble recovery window G2.

This brings up a recovery operation screen G3 shown in FIG. 4 for performing recovery operations according to the contents of the measures, or an advice screen G4 shown in FIG. 5 instructing the recovery operation method or advice information.

FIG. 5 illustrates an advice screen G4 displayed in the event that trouble solving operations cannot be made with the operating buttons on the control panel 13.

Now, this arrangement has been described with the understanding that transition is made from the display screen shown in FIG. 3 to that shown in FIG. 4 or 5 by trouble item countermeasures, but an arrangement may be made wherein the contents of FIGS. 4 and 5 are displayed on the same screen. FIG. 6 illustrates a mixed screen G5 displayed with such an arrangement. With this mixed screen G5, an operating screen containing at least one operation button to be operated for solving the trouble item is displayed along with a reduced connection diagram for example relating to solving of the trouble in a simultaneous manner, and the advice display to the effect of "please check the connection of the cable indicated by a dotted line", for example, is also given.

Also, in the event of displaying a connection diagram as the advice screen G4 as shown in FIG. 5, the connection diagram serving as the advice screen G4 may be displayed in an enlarged manner as shown in FIG. 7, in the event that the portion to be displayed is too complicated, or in order to facilitate understanding of the displayed diagram.

Also, in the event of displaying the advice screen G4 shown in FIG. 5, an arrangement may be made wherein a screen G6 shown in FIG. 8 is displayed beforehand indicating an icon, such that clicking (touching) the icon displays a connection diagram containing the picture cable corresponding to the icon, and shown in FIG. 5 and so forth.

In the case shown in FIG. 3, probable causes of the trouble that the color is abnormal are: (1) erroneous operation of the white balance; (2) improper color settings for the liquid crystal monitor; (3) malfunctioning of hardware, such as camera or monitor; and (4) aging of the back-light of the liquid crystal monitor.

Figure 29:
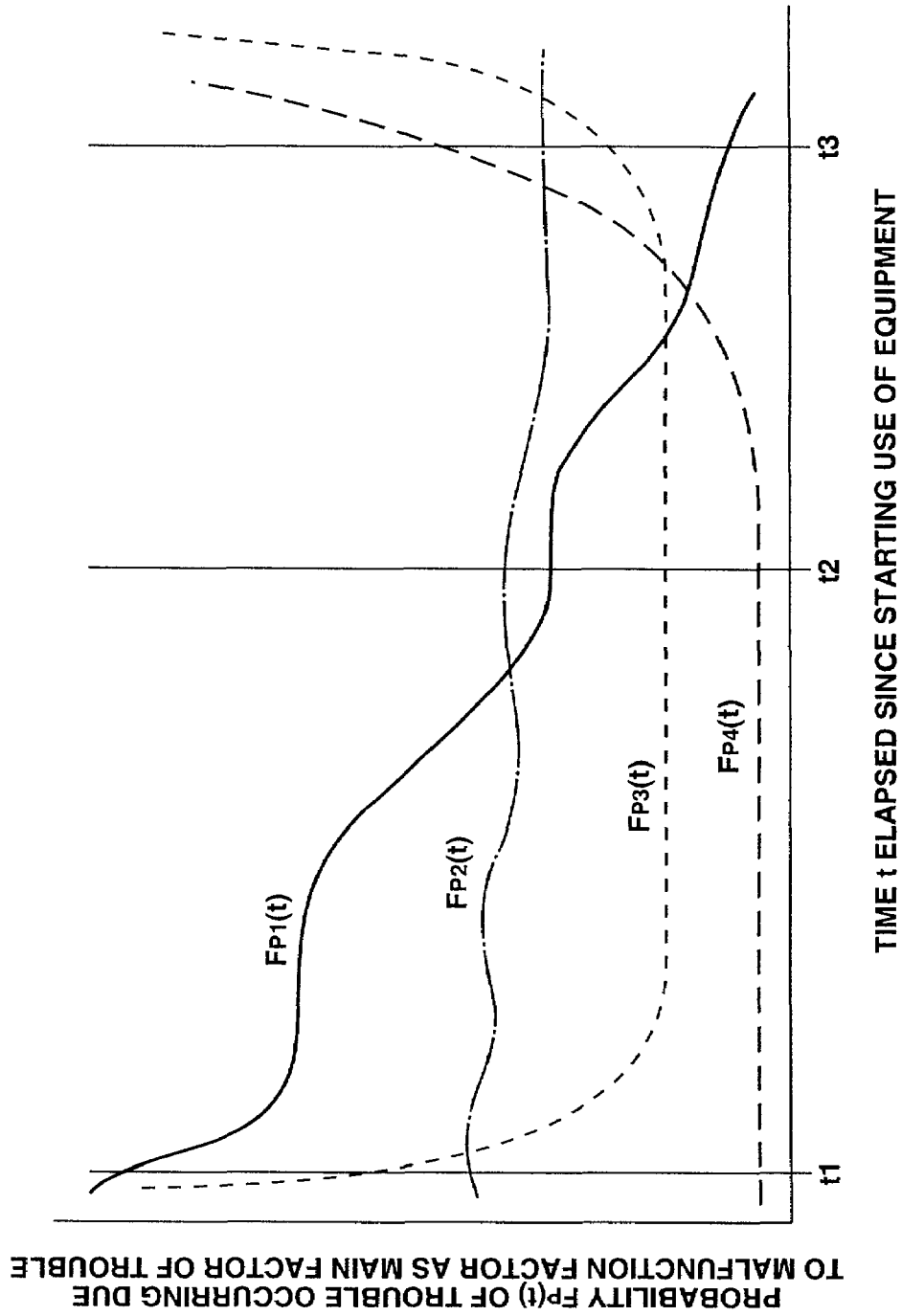
FIG. 29 is a diagram illustrating the probability of occurrence of troubles due to four causes, according to time functions.

FIG. 29 illustrates the probability of occurrence of trouble which occurs as the causes (1) through (4) as the cause thereof, as functions of time.

In FIG. 29, $Fp1(t)$ denotes the probability of (1) occurring, $Fp2(t)$ denotes the probability of (2) occurring, $Fp3(t)$ denotes the probability of (3) occurring, and $Fp4(t)$ denotes the probability of (4) occurring. This probability information is stored in the above-described recording medium 16'.

The CPU 15 calculates the occurrence probability $Fp1(t)$ through $Fp4(t)$ for (1) through (4) at the point that the maintenance button 21b is operated from the control panel 13.

As can be seen in FIG. 29, the occurrence probabilities $Fp1(t)$ through $Fp4(t)$ for (1) through (4) change over time.

$Fp1(t)$, which is the probability of (1) occurring, is the probability of trouble occurring due to erroneous operations of the white balance of the television camera, and this is primarily affected by the experience of the staff handling the equipment in the surgery room with regard to setting the camera equipment before the surgery.

The reason that the probability of occurrence undulates over time is most likely due to the fact that the staff in the surgery room changes either periodically or otherwise, so the experience level of the staff drops immediately following switching of staff and accordingly the probability of erroneous operations increases.

However, using television cameras for a long time raises the level of experience of all of the staff in the surgery room, so the degree of fluctuations tends to decrease over time.

$Fp2(t)$, which is the probability of (2) occurring, is the probability of trouble occurring due to improperly setting the color settings for the liquid crystal monitor, which is always around the same occurrence probability with little change, and is not affected by passage of time.

$Fp3(t)$, which is the probability of (3) occurring, is the probability of trouble occurring due to malfunctioning of the hardware, such as television camera, liquid crystal monitor, picture cables, etc. Generally, the probability of malfunctions of hardware happening exhibits a U-shaped curve, wherein the probability is somewhat high at first, stabilizes at the middle, and rises at the end due to malfunctions of parts that have aged.

$Fp4(t)$, which is the probability of (4) occurring, is the probability of trouble occurring due to change in color owing to aging of the back-light of the liquid crystal monitor, a trouble which is characterized by higher probability of occurrence over time, once a certain amount of time has elapsed.

In the event that the user selects "COLOR IS ABNORMAL" as a trouble item in FIG. 3, at that point the CPU 15 calculates the occurrence probability $F(t)$ relating to "COLOR IS ABNORMAL", and displays counter measures to the right of the screen in FIG. 3 in accordance with the causes with the higher probability of occurrence. For example, at t1 (initial stage) in FIG. 29, the probabilities can be expressed having the mutual relation of $$Fp1(t)>Fp3(t)>Fp2(t)>Fp4(t)$$

while in the middle stage t2

$$Fp2(t)>Fp1(t)>Fp3(t)>Fp4(t)$$

holds, and toward the end stage t3

$$Fp4(t)>Fp2(t)>Fp3(t)>Fp1(t)$$

holds.

Accordingly, at point t1, the contents of the trouble recovery window screen G2 shown in FIG. 3 will be in the order of, from the top down, (1) erroneous operation of the white balance, (3) malfunctioning of hardware such as camera or monitor, (2) improper color settings for the liquid crystal monitor, and (4) aging of the back-light of the liquid crystal monitor. Thus, the countermeasures are redisplayed in the order of the causes which most readily cause the trouble at the point that the trouble has occurred, so speedy measures can be taken.

In the same way, at point t3, the contents of the trouble recovery window screen G2 shown in FIG. 3 will be in the order of, from the top down, (4) aging of the back-light of the liquid crystal monitor, (2) improper color settings for the liquid crystal monitor, (3) malfunctioning of hardware such as camera or monitor, and (1) erroneous operation of the white balance.

Thus, a major characteristic of the present embodiment is that the menu window screen G1 displaying the trouble items are this displayed, and in the event that a trouble item is selected and specified therefrom, the CPU 15 calculates the probability of occurrence of the causes corresponding to that trouble item in the devices connected thereto, and displays the countermeasures in descending order of those with the highest probability of occurrence.

The operation of this medical device system 1B will be further described with reference to the flowchart shown in FIG. 30.

As shown in FIG. 28, the devices to be used are connected, and the power is turned on. This causes the CPU 15 of the system controller 8 to read out the control program recorded in the recording medium 16', and recognize the devices connected to the system controller 8.

Next, the main screen (normal operating screen) G0 such as shown in FIG. 2 is displayed on the display face of the control panel 13, whereby the information of the settings state of the primary devices can be displayed, settings can be made for controlling the actions of the primary devices, and so forth.

Figure 30:
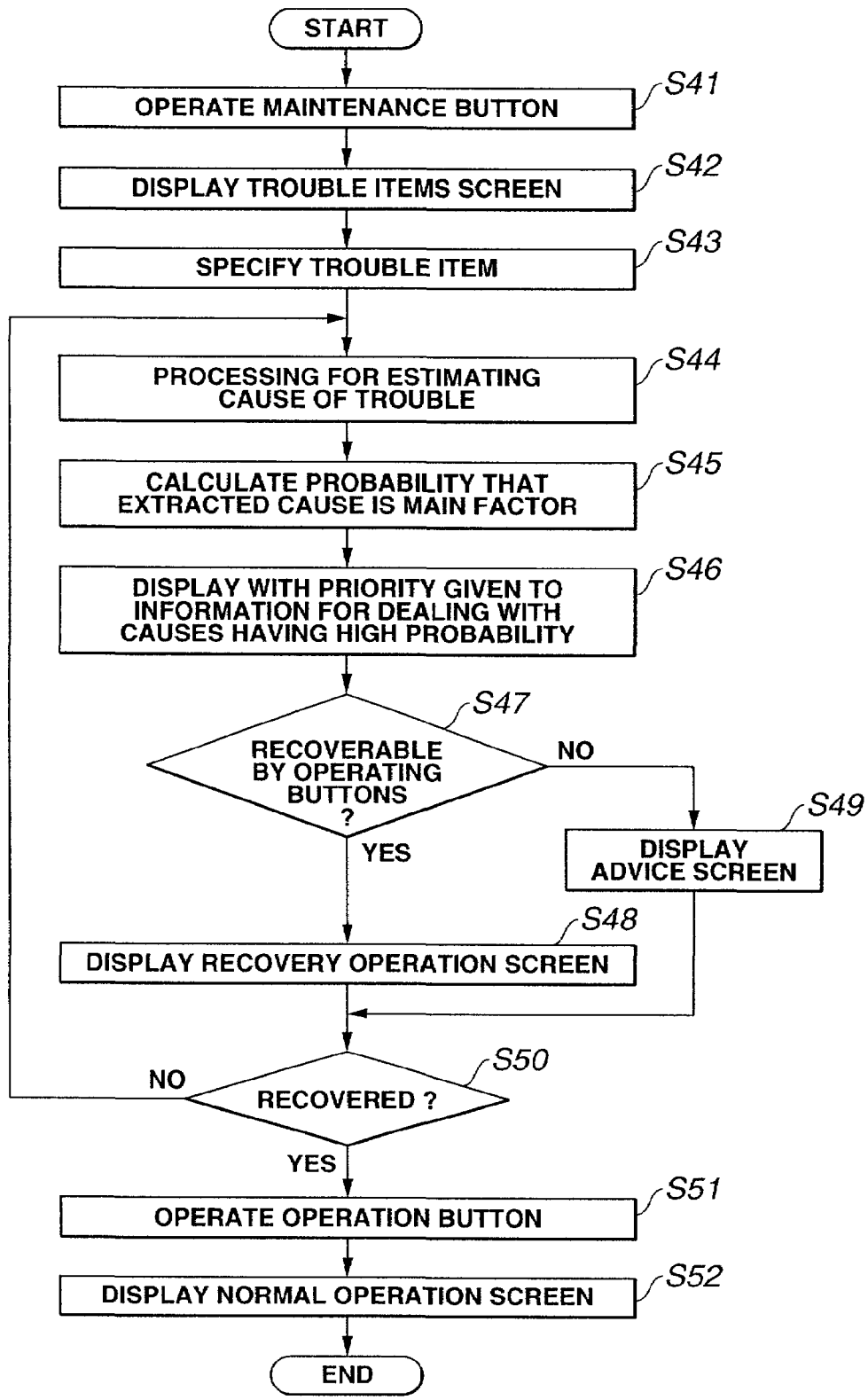
FIG. 30 is a flowchart illustrating actions in the maintenance mode.

Then, in the event that condition suspected of being trouble occurs during use of the system 1B or at other times, the user presses the maintenance button 21b (displayed on the main screen G0 shown in FIG. 2) as shown in step S41 in FIG. 30.

This causes the screen to change from the main screen G0 to a screen displaying trouble items in step S42, i.e., to change to the display of the menu window screen G1 shown in FIG. 3.

In the menu window screen G1 shown in FIG. 3, the user specifies a trouble item as indicated by step S43. Specifically, in the menu window screen G1, the user checks for a trouble item from the major trouble items, and then selects a trouble sub-item which more specifically matches the trouble, and touches this item to specify the trouble sub-item.

By specifying the trouble sub-item, the control panel 13 sends contents specified thereby to the CPU 15.

Then, as indicated by step S44, the CPU 15 performs estimation processing for estimating the cause of occurrence of the trouble from the specified trouble item.

For example, in the event that a trouble item is specified stating that the monitor screen is dark, estimation of causes for the trouble item to occur is made for the power source systems, light source systems, signal processing systems, image display systems, etc., in the medical device system 1B to which the multiple controlled devices such as the TV camera (1) 3A, light source device (1) 4A, and so forth are connected.

For the purpose of this estimation, recognition of the devices connected as the medical device system 1B, information (data) regarding the functions and the configuration and the like of the devices, the probability of occurrence of each of the causes which could cause trouble, and information of the accumulated usage time from installing the medical device system 1B and the amount of time elapsed since installation, are recorded in the recording media 16' beforehand.

Then, the CPU 15 extracts (lists) the primary causes of the trouble occurring by estimation as indicated in step S45, and performs processing for calculating the probability of occurrence thereof.

That is to say, in the event that the CPU 15 estimates a primary cause for a trouble occurring, the value of the occurrence probability thereof causing that trouble to occur at the time of the trouble occurring is calculated from the information of the probability of occurrence of that cause stored in the recording medium 16' as a function of the time t. Note that time t is the accumulated usage time of the medical device system 1B from the time of installation, or the time elapsed since the date of installation. In other words, this elapsed time is the accumulated time of using the system controller 8 as a control device making up the medical device system 1B or the time elapsed from the date of installation.

In the next step S46, the CPU 15 lists and displays causes (generally multiple) in such a manner that the causes having the highest probability of occurrence, calculated in step S45, are listed with the highest priority.

That is to say, those with higher possibility of causing the trouble are listed with higher priority. Further, information of the countermeasures or recovery methods or the like for the causes are also displayed such that the countermeasures dealing with the causes having higher probability of occurrence are given higher priority in the listing, either by listing the priority thereof or by sequential listing. This means that the user can efficiently recover from the trouble item, by performing the work or the like according to the countermeasures information displayed with higher priority.

In this case, as indicated by step S47, the CPU 15 performs judgment regarding whether the operation for recovering can be effected by operating the operating buttons 20 shown in FIG. 2 (or any other operating switches besides those shown in FIG. 2) provided on the control panel 13, or whether other operations or work is necessary.

In the event that the trouble can be recovered from by operating the operating buttons 20, the recovery operation screen displaying the operating buttons 20 and the like is displayed, as indicated by step S48. For example, with this recovery operation screen, in the event that control can be made from the control panel 13, an increase control button for increasing the amount of light of the light source device (1) 4A is displayed on the display face of the control panel 13, so that operation thereof causes the CPU 15 to perform control so as to increase the amount of light, or a gain increase control button for increasing gain of the TV camera (1) 3A is displayed, so as to increase the gain in the event that this is operated. Thus, recovery from the trouble item is attempted.

In the event that the CPU 15 cannot control increasing of the amount of light of the light source device (1) 4A and so forth via the control panel 13, a button for increasing the amount of light of the light source device (1) 4A is displayed in the advice screen along with advice or instructions to perform that operation.

On the other hand, in the event that the trouble is of a type which cannot be recovered from by operating the operation buttons, an advice screen for performing the work is displayed, as indicated in step S49. In this advice screen, a connection diagram or the like to the effect of "please check the connection state of the connection cable between the TV camera (1) 3A and the monitor (1) 5A" is displayed, and a display is made (advice is given) to facilitate the work.

Following performing the steps S48 or S49, the CPU 15 prompts the display face of the control panel 13 regarding whether the trouble item has been recovered from or not (step S50). In the event that the trouble item has been recovered from, the user operates the operation button 21a (step S51), returns to the main screen (normal operation screen) display G0 (step S52), and ends the maintenance processing.

On the other hand, in the event that the trouble item has not been recovered from in the judgement in step S50, the flow returns to step S44, the CPU 15 takes into consideration the results of the recovery operations and the like, performs processing for estimating the cause, and estimates a method or the like for recovering from the trouble item, based on the processing results.

In this case, in the event that there are multiple operations and methods for recovering from the trouble item, and recovery is not effected by one of these, the probability that same estimation processing as before will be made at step S44 is high, the estimation result whereby the trouble was not recovered from is eliminated in step S45 and the probability of the primary cause is calculated thereupon, and in step S46 the remaining estimation results are sequentially listed and displayed with highest priority given to the primary cause with the highest probability therein (which was most likely the second highest probability before the formerly-highest probability was eliminated). Of course, the countermeasures are also re-listed accordingly, with the countermeasures dealing with the cause given the highest priority being displayed with the highest priority.

Then, trouble recovery processing is performed by step S47 and so forth.

In the event that all operations and methods for recovering from the estimated trouble cause are exhausted but the trouble item is still not recovered from, other causes are estimated in step S44, and recovery methods and the like for recovering therefrom are estimated in step S45 based on the estimation results.

Thus, according to such processing, causes with higher probability of causing the trouble are estimated, countermeasure methods and the like with higher probability of solving the trouble in light of the estimation results are sequentially displayed giving higher priority thereto, and in the event that the trouble item is not resolved the results are taken into consideration and countermeasure methods and the like with lower probability are displayed, so the user can easily solve the trouble by performing the operations and the like following the displayed screen.

Thus, according to the present embodiment, even in the event that trouble which is not detected has occurred, upon specification of trouble items, countermeasure methods and the like for recovering from the trouble are displayed with that having the highest probability given at the time of the trouble occurring is displayed, so trouble can be recovered from more easily and more readily by performing the operations and work and the like following the information displayed.

Next, a modification of the present embodiment will be described.

This modification has the same configuration as that shown in FIG. 1, but a part of the operating program differs.

More specifically, the conditions input by the user from the control panel 13 are stored in the recording medium 16', and the aforementioned input conditions are used in the process of estimating the cause of the trouble.

In FIG. 28, the user inputs conditions related to occurrence of the trouble from the control panel 13. Examples of the conditions input here might include the following.

(1) Time elapsed from starting the endoscope surgery.
(2) Time elapsed from starting using the medical device system.
(3) Past medical equipment repair information.
(4) Number of medical device systems owned.
(5) Frequency of use of medical device system.

Inputting this information from an unshown input screen on the control panel 13 and storing it in the recording medium 16' allows the CPU 15 to obtain the following information in the course of estimating the cause of the trouble.

(A) Level of experience of user with endoscope surgery.
(B) Level of experience with medical device system.
(C) Experience with in-hospital maintenance system for medical equipment.

Obtaining this information allows more detailed calculation of occurrence probability in step S45 of FIG. 30.

For example, representing factors relating to erroneous operations with probability a, this a can be represented with the parameters A through C. In this case, Fp1(t) in the fifth embodiment is represented by the following Fp1'(t)

$$Fp1'(t)=Fp1(t)+\alpha$$

wherein α does not have to be a constant, but may be a function values such as a factor like time or so forth.

Based on this expression, the cause of the trouble can be estimated in light of the user characteristics, so trouble can be resolved in a speedier and more sure manner.

Note that in the event that the cause of the trouble occurring is estimated as described above, the trouble can be resolved efficiently by performing operations and work following countermeasures information displayed with the countermeasures information dealing with the cause having the highest probability of occurrence displayed with highest priority.

The present invention also encompasses arrangements wherein causes having the highest probability of occurrence are being displayed with highest priority upon estimation of causes of trouble as with the present embodiment, and the user specifies the cause having a high probability of occurrence from this display, thereby displaying countermeasures information corresponding thereto.

(Sixth Embodiment)

Next, a sixth embodiment of the present invention will be described with reference to FIGS. 31 through 35. The present embodiment enables trouble that is occurring to be effectively dealt with by sending information using communication lines in the event that trouble has occurred. The configuration of the present embodiment is similar to that of the second embodiment.

Figure 31:
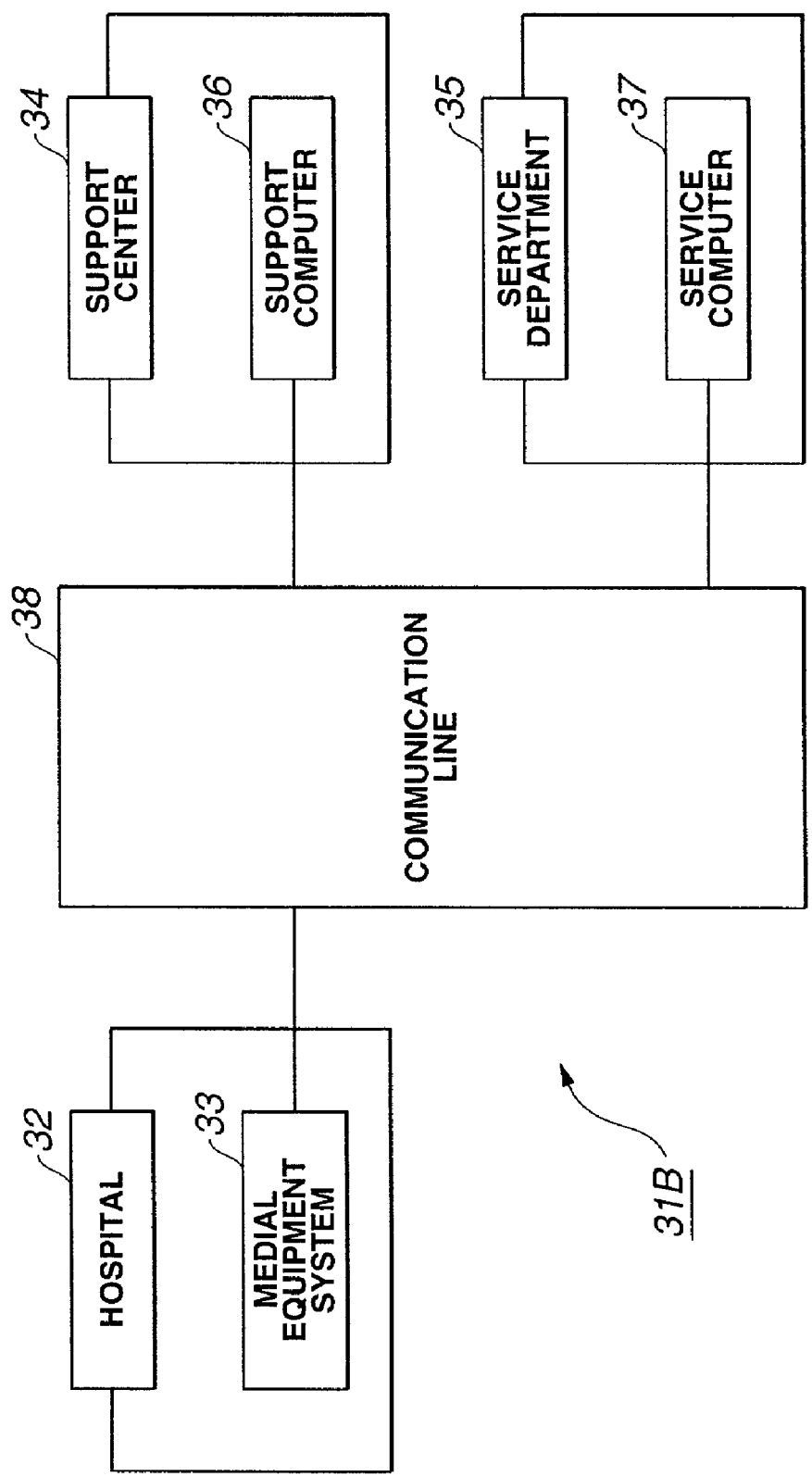

As shown in FIG. 31, the medical device control system 31B according to the sixth embodiment of the present invention comprises a medical device system 33 provided in a hospital 32, a support center 34 (support department) which provides large-scale support such as maintenance of the medical device system 33 and so forth, and a service department 35 which provides small-scale maintenance of the medical device system 33 and so forth. The medical device system 33 is communicably connected with the support computer 36 of the support center 34, and the service computer 37 of the service department 35 via a communication line 38.

Note that the support center 34 and the service department 35 may be situated at a remote location from the hospital 32, but the service department 35 should not be too remote from the hospital 32, so that replacement of parts and so forth can be performed in the event of malfunctioning.

The support center 34 and the service department 35 operate in joint fashion, to perform maintenance and support operations for the medical device system 33 of the hospital 32. For example, the support center 34 has functions for performing extremely detailed maintenance of the medical device systems 33, and in the event that there is the need to replace parts due to malfunctioning or the like, service personnel can be dispatched from the service department 35 to the hospital 32 to replace the parts or the like, so the support center 34 can undertake a wide variety of maintenance operations, such as maintenance and the like which necessitates repairs, not to mention maintenance which does not require repairs.

Figure 32:
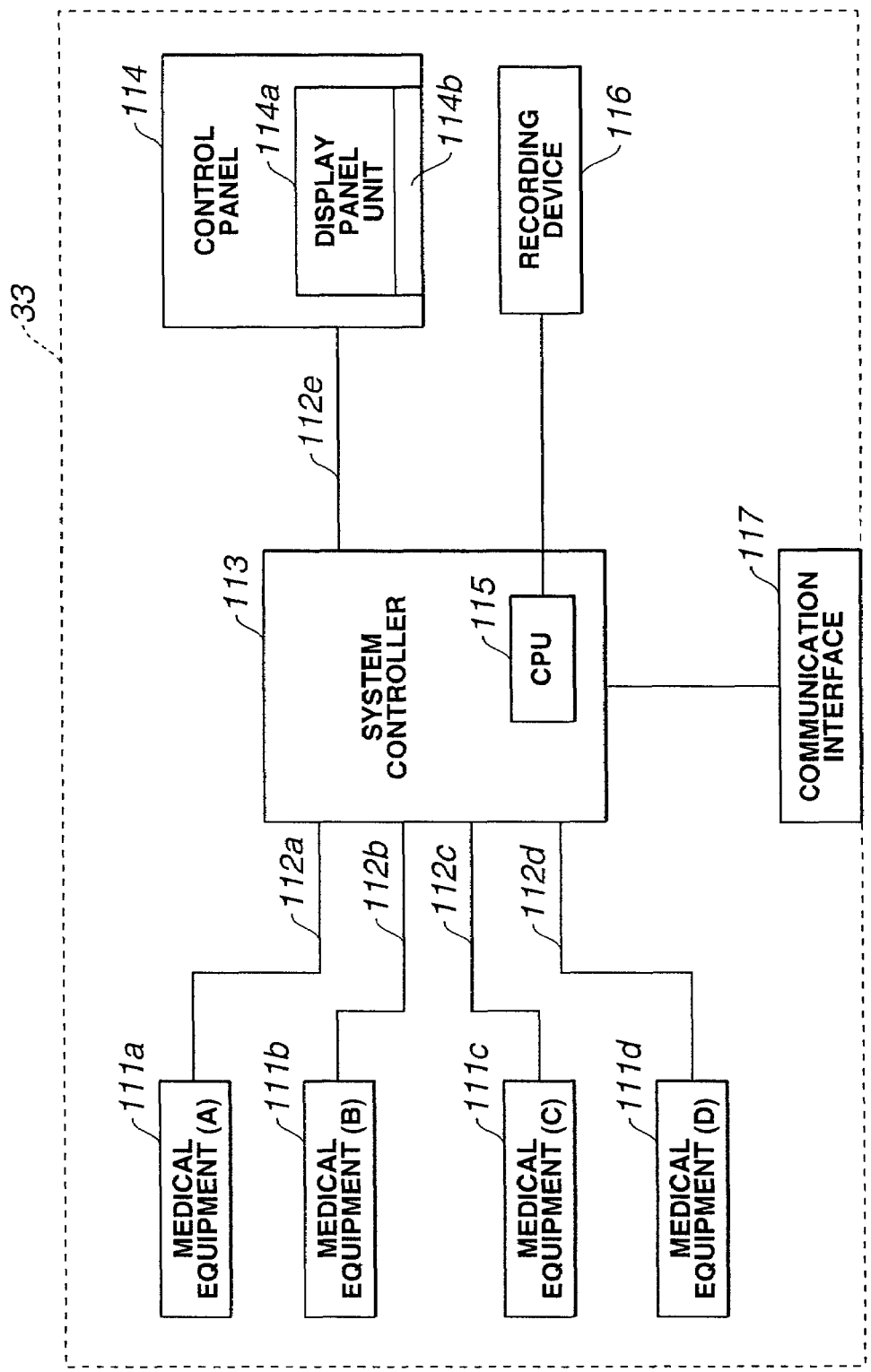

As shown in FIG. 32, the medical device system 33 comprises: multiple medical devices, in this case medical device (A) 111a, medical device (B) 111b, medical device (C) 111c, and medical device (D) 111d; a system controller 113 for performing centralized control and surveillance of the medical devices (I) 111i (note that I represents A through D and i represents a through d) which are each connected via communication lines 112i; a control panel 114 connected to the system controller 113 via a communication line 112e, for operations controlling the medical devices (I) 111i and for functions displaying the status of the medical devices (I) 111i; and a communication interface 117 connected to the system controller 113 via a communication line 112f; wherein information can be exchanged with an external support computer 6 and a service computer 7 via a communication line 8 connected to the communication interface 117.

The control panel 114 has a display panel unit 114a for displaying the status of the medical devices (I) 111i and operation buttons 20 (see FIG. 3) for controlling a medical device (J) 111j which can be controlled thereby, and a touch panel unit 114b provided on the front face of the display panel unit 114a, so that in the event that the user touches an operating button 20 displayed on the display panel unit 114a, the touch panel unit 114b can detect the touch at that position, thereby enabling controlling operations and the like for controlling a medical device (J) 111j which can be controlled from the system controller 113 side.

That is to say, position signals detected at the touch panel unit 114b of the control panel 114 are transmitted to the system controller 113, and the system controller 113 can perform controlling of actions of the medical device (J) 111j corresponding to the operations made thereupon.

Also, the system controller 113 is connected to a recording device 116 such as a hard disk, EEPROM (or flash memory) or the like, storing a program determining the controlling actions at the point that the medical device system 3 is activated, and at the point that the power of the medical device system 3 is turned on, a CPU 115 provided within the system controller 113 reads out the program from the recording device 116, and performs controlling actions following the program.

For example, in the event that the medical device system 33 is activated, the CPU 115 of the system controller 113 displays a normal operating screen (main screen) G0 such as shown in FIG. 2 on the display panel unit 114a of the control panel 114.

Also, displayed at the bottom left side for example of the main screen G0 are an operation button 21a for performing an operation of returning to the main screen G0, a maintenance button 21b for performing maintenance processing in the event that trouble or the like occurs, and further a status transmission button 21c for transmitting information such as status information or the like of the system 3 in the event of receiving support regarding maintenance from an external support center 4 side or the like via the communication line 8.

The recording device 116 also stores programs for displaying a menu window screen G1 having a great number of trouble items such as shown in FIG. 3 by operating the maintenance button 21b in the event that trouble occurs while operating or the like in the main screen G0, and for processing for displaying a recovery operation screen G2 wherein in the event that a trouble item matching the trouble is specified from the menu window screen G1 a countermeasure or the like for recovering from the trouble item is estimated and displayed to the right side in FIG. 3, and so forth.

Note that there are jump switches 22 at the recovery operation item spaces in the recovery operation screen G2 shown in FIG. 3, and operating the jump switches 22 displays the recovery operation screens for sub-items.

Also, in the event that the user operates the maintenance button 21b to recover from the trouble item but cannot successfully recover, operating the status transmission button 21c allows transmission of information needed by the support computer 36 of the support center 34 and the service computer 37 of the service department 35 from the data accumulated in the medical device system 33, almost simultaneously.

With the present embodiment, recovery measures for trouble items occurred in the medical device system 33 can be speedily implemented, by transmitting information needed by each of multiple external system support departments (system support devices) in an almost simultaneous manner.

Next, the operation of the present embodiment will be described.

In the state wherein the medical device system 33, the support computer 36, and the service computer 37, are connected with the communication line 38 as shown in FIG. 31, turning on the power of the medical device system 33 causes the CPU 115 of the system controller 113 making up the medical device system 33 to read out the program from the recording device 116 and perform the initialization processing, and the normal operating screen (main screen) G0 such as shown in FIG. 2 is displayed on the display panel unit 114a of the control panel 114.

In the main screen G0 shown in FIG. 2, the medical devices (I) 111i are indicated with examples of more specific device names.

Operating the operation buttons 20 or the like allows the user to perform operations such as changing the setting values and so forth.

Also, in the event that trouble occurs while in use, operating the maintenance button 21b brings up the menu window screen G1 shown in FIG. 3. In the event that the user specifies a trouble item, the CPU 115 performs processing for estimating the cause of that trouble item occurring, estimates countermeasures for recovering from the trouble based on the above estimation results, and displays these on the recovery operation screen G2.

Figure 33:
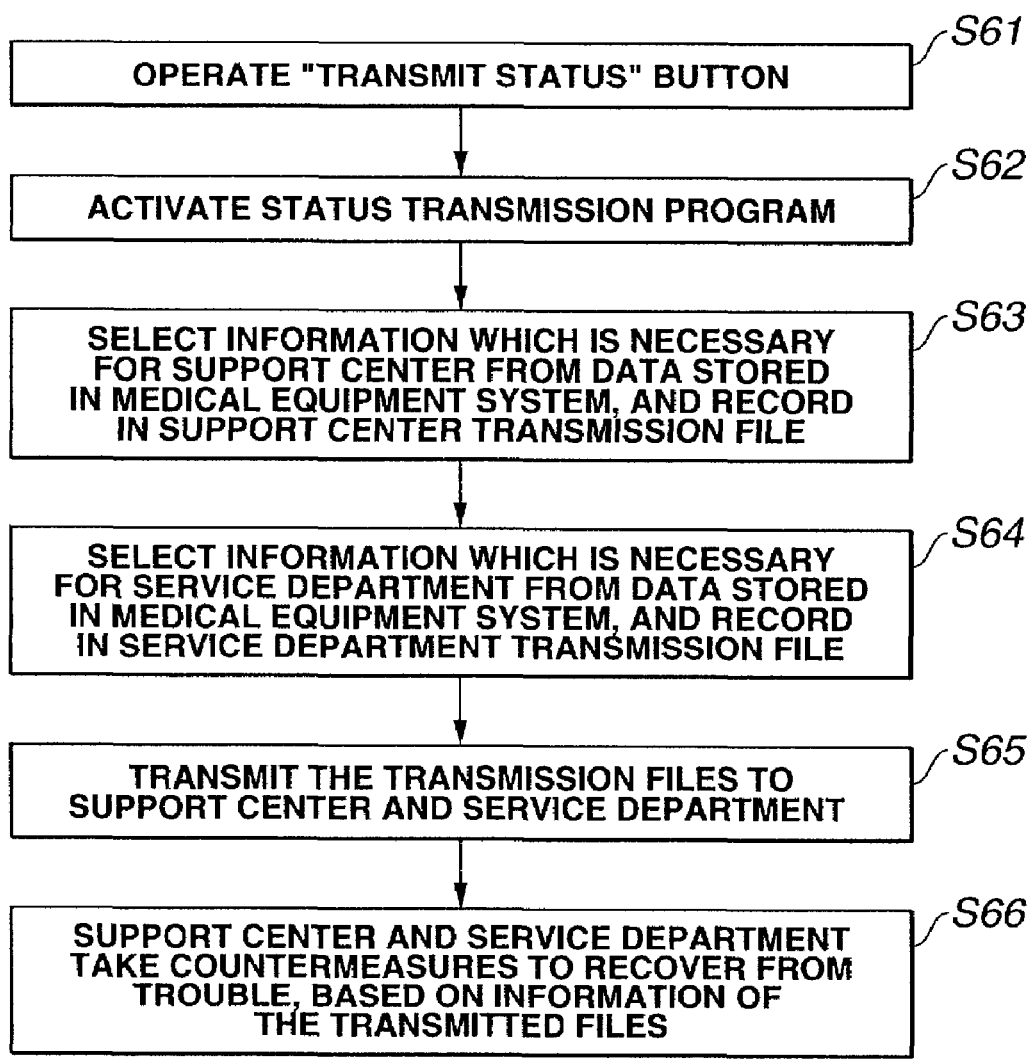

Operating following the displayed contents of the recovery operation screen G2 allows the trouble item to be recovered from in many cases. In the event that the trouble still cannot be recovered from, the user operates the status transmission button 21c. This causes the CPU 115 to activate a status transmission program and perform the processing such as shown in FIG. 33.

That is to say, in the event that the user operates the status transmission button 21c as indicated in step S61, the status transmission program is activated as indicated in step S62. Following activation of this status transmission program, as indicated in step S63, the CPU 115 selects information which the support center 34 needs from the data accumulated in the medical device system 33, and records this information in a support center transmission file.

Also, as indicated in step S64, the CPU 115 selects information which the service department 35 needs from the data accumulated in the medical device system 33, and records this information in a service department transmission file.

Then, as indicated in step S65, the CPU 115 transmits the data of the transmission files to the support center 34 and service department 35 via the communication line 38.

Subsequently, as indicated in step S66, reference is made to the transmitted transmission files at the support center 34 and the service department 35, where processing is performed in a joint manner to study countermeasures to recover from the trouble item.

For example, in the event that the countermeasures are simple procedures which the user side can easily handle, the user is notified of the countermeasures, and performs recovery from the trouble item. That is to way, the user can speedily resolve the trouble or the like which has occurred by receiving support from staff more skilled in maintenance.

Also, in the event the support center 34 and the service department 35 cooperate and the support center 34 judges that a device is malfunctioning or so forth, the support center 34 side contacts the service department 35 side with instructions to replace parts or so forth to fix the malfunction, and service personnel are dispatched from the service department 35 side to the hospital 32, to perform recovery from the trouble item in a speedy manner.

In this case, the service department 35 side has received information that trouble has occurred at the time of the trouble occurring, almost at the same time as the support center 34 side has received, so the service department 35 side can prepare to deal with the trouble at an early stage.

According to the present embodiment, in the event that the user cannot readily deal with the situation, information for receiving support is transmitted to multiple external locations almost simultaneously, so the trouble item can be speedily recovered from.

Also, with the present embodiment, in the event that multiple support departments with different functions, sizes, and so forth, exist, the information which each of the multiple support departments needs in the event of the user requesting support for recovery from the trouble item is transmitted to the departments almost simultaneously, so the departments can speedily deal with the trouble item by operating in joint fashion, or the like.

Next, a modification will be described with reference to FIGS. 34 and 35.

Figure 34:
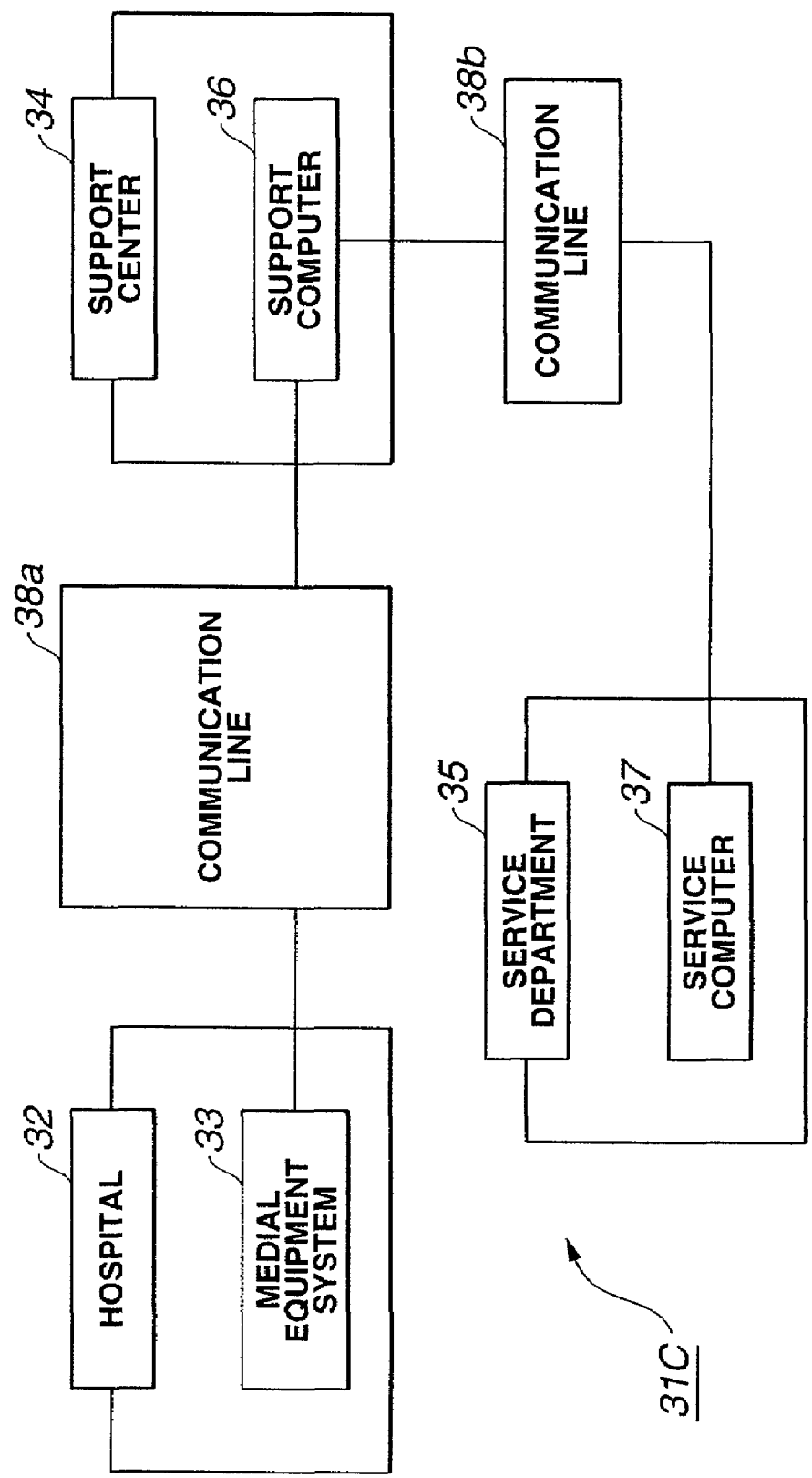

With the medical device control system 31C shown in FIG. 34, the medical device control system 31C has the medical device system 33 of the hospital 32 connected to the support computer 36 of the support center 34 via a communication line 38a, and the support computer 36 of the support center 34 connected to the service computer 37 of the service department 35 via a communication line 38b.

With the configuration shown in FIG. 34, communication can be made between at least the hospital 32 and the support center 34, and also communication can be made between the support center 34 and the service department 35, and other configurations having the same functions will suffice, or the configuration shown in FIG. 31 will suffice, as well.

With the present modification, upon the status transmission button 21c being pressed as described below, detailed information necessary for supporting recovery from the trouble item or the like is transmitted from the medical device system 33 of the hospital 32 to the support computer 36 of the support center 34. The support computer 36 of the support center 34 then automatically sorts out the information sent thereto and creates information needed by the service department 35, and transmits that information to the service computer 37 of the service department 35.

Next, the operation of the present embodiment will be described with reference to the flowchart shown in FIG. 35. Steps S61, S62, and S63 are the same as with FIG. 33. Following step S63, in step S67 a support center transmission file is transmitted from the hospital 32 (or more specifically, the medical device system 33 thereof) to the support center 34 (or more specifically, the support computer 36 thereof).

In response, the support center 34 (or more specifically, the support computer 36 thereof) sorts out the information needed by the service department 35 from the support center transmission files transmitted as indicated in step S68, and records the partial selected information in a service department transmission file.

Then, in step S69, the support center 34 (or more specifically, the support computer 36 thereof) transmits the service department transmission file to the service department 35 (or more specifically, the service computer 37 thereof).

Subsequently, as indicated in step S70, the support center 34 and the service department 35 make reference to the transmitted transmission files to study, in a joint fashion, countermeasures to recover from the trouble item.

The present modification has approximately the same advantages as the sixth embodiment.

Note that the present invention also encompasses any embodiments configured by combining parts of the above-described embodiments.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A maintenance method for performing maintenance with a medical control apparatus, connectable to medical devices used for medical purposes such that said medical control apparatus controls said medical devices, said method comprising:
   a specifying step for specifying a trouble item;
   a processing step for performing estimation processing for at least one of recovery operations and an operation related to recovery operations for recovering from trouble of an item specified in said specifying step; and
   a display step for displaying information of at least one of said recovery operations and said operation related to recovery operations performed in accordance with a selection by a user.

2. The maintenance method for a medical control apparatus according to claim 1, wherein a screen display is provided in a menu format screen displaying said trouble items in general major items and more specific sub-items contained in said major items.

3. The maintenance method for a medical control apparatus according to claim 1, wherein a first screen for displaying said trouble items, and a second screen for displaying information of at least one of said recovery operations and said operation related to recovery operations, are display screens having a hierarchical structure.

4. The maintenance method for a medical control apparatus according to claim 1, wherein, in said second screen, an operation screen display can be set wherein operating operation buttons enables controlling of the medical devices.

5. The maintenance method for a medical control apparatus according to claim 1, wherein at least one of said recovery operations and said operation related to recovery operations, displayed in said display step, comprises at least one of information of an operation screen displaying operation buttons wherein there is the possibility of recovery from the trouble item by operating said operation buttons and information of an advice screen displaying advice wherein there is the possibility of recovery from the trouble item by performing work following the contents of said advice.

6. A recording medium storing a program for a maintenance method for performing maintenance with a medical control apparatus, connectable to medical devices used for medical purposes such that said medical control apparatus controls said medical devices, said program comprising:
   code for a specifying step for specifying a trouble item;
   code for a processing step for performing estimation processing for at least one of recovery operations and an operation related to recovery operations for recovering from trouble of an item specified in said specifying step; and
   code for a display step for displaying information of at least one of said recovery and said operation related to recovery operations performed in accordance with a selection by a user operations.

7. A maintenance method for a medical control apparatus which outputs control information for controlling medical devices to said medical devices used for medical purposes via a communication interface, and receives information of the state of actions from said medical devices via an interface, said method comprising:
   a maintenance instructing step for instructing maintenance;

a trouble item display step for displaying on a predetermined display device a plurality of trouble items relating to set-up of said medical device, according to said maintenance instructing step;

a specifying step for specifying at least one trouble item of said plurality of trouble items displayed in said trouble item display step; and a display step for displaying countermeasures information for recovering from the at least one trouble item specified in said specifying step.

8. The maintenance method for a medical control apparatus according to claim 7, further comprising a transmission step for transmitting information relating to maintenance to external support devices via a communication line, in the event that a transmission button is operated.

9. The maintenance method for a medical control apparatus according to claim 7, wherein said trouble item display step performs screen display of a menu format for displaying a menu indicating an overview of trouble items, and submenus indicating more detailed items contained in said menu.

10. A maintenance method for a medical control apparatus which outputs information for controlling said medical devices to medical devices used for medical purposes control via a communication interface, and receives information of the state of actions from said medical devices via a communication interface, comprising:

a maintenance instructing step for instructing maintenance;

a trouble item display step for displaying trouble items relating to said medical devices, according to said maintenance instructing step;

a specifying step for specifying at least one trouble item of said trouble items displayed in said display step;

an estimating step for estimating causes causing said trouble item, in response to said trouble item specified in said specifying step; and a priority display step for displaying, with higher priority, countermeasures information estimated in said estimating step to have a higher probability of being the cause of said trouble item, as compared with countermeasures information with lower probabilities.

11. The maintenance method according to claim 10, wherein, in the event of estimating the cause of said trouble item in said estimating step, reference is made to information of the occurrence probability for causing said trouble item.

12. The maintenance method according to claim 11, wherein said occurrence probability information includes information regarding an accumulated usage time of said medical devices.

13. A recording medium storing a program for a maintenance method for a medical control apparatus which outputs control information for controlling medical devices to the medical devices used for medical purposes via a communication interface, and installs information of the state of actions received from said medical devices via a communication interface in said medical control apparatus, wherein the program is executable to perform a method comprising:

a maintenance instructing step for instructing maintenance;

a trouble item display step for displaying trouble items relating to said medical devices, according to said maintenance instructing step;

a specifying step for specifying at least one trouble item of said trouble items displayed in said trouble item display step;

an estimating step for estimating causes causing said trouble item specified in said specifying step; and a priority display step for displaying, with higher priority, countermeasures information estimated in said estimating step to have a higher probability of being the cause of said trouble item, as compared with countermeasures information with lower probabilities.

* * * * *